United States Patent
Pohl

(10) Patent No.: US 10,438,318 B2
(45) Date of Patent: Oct. 8, 2019

(54) BLIND SPOT RENDERING OPTIMIZATIONS FOR EYE TRACKING HEAD MOUNTED DISPLAYS

(71) Applicant: Intel IP Corporation, Santa Clara, CA (US)

(72) Inventor: Daniel Pohl, Saarbrücken (DE)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/251,180

(22) Filed: Aug. 30, 2016

(65) Prior Publication Data

US 2018/0061117 A1     Mar. 1, 2018

(51) Int. Cl.
*G06T 19/00* (2011.01)
*G06F 3/01* (2006.01)
*G06T 15/00* (2011.01)
*G06T 3/00* (2006.01)

(52) U.S. Cl.
CPC ............ *G06T 3/0012* (2013.01); *G06F 3/013* (2013.01); *G06T 15/005* (2013.01); *G06T 19/006* (2013.01); *G06T 2210/36* (2013.01)

(58) Field of Classification Search
CPC .............. G06T 19/006; G06K 9/00671; G02B 27/017–0176; G02B 2027/0174; G02B 2027/0178; A61B 2019/5291
See application file for complete search history.

(56) References Cited

U.S. PATENT DOCUMENTS

| | | | |
|---|---|---|---|
| 4,348,186 A | 9/1982 | Harvey et al. | |
| 8,184,069 B1 * | 5/2012 | Rhodes | G02B 27/017 345/8 |
| 2003/0011618 A1 * | 1/2003 | Deering | G06T 5/20 345/613 |
| 2008/0002262 A1 | 1/2008 | Chirieleison | |
| 2012/0300978 A1 | 11/2012 | Eberl et al. | |
| 2014/0184475 A1 * | 7/2014 | Tantos | H03M 13/356 345/8 |

(Continued)

FOREIGN PATENT DOCUMENTS

WO     WO 2009/094643     7/2009

OTHER PUBLICATIONS

Duchowski, Andrew T., and Arzu Çöltekin. "Foveated gaze-contingent displays for peripheral LOD management, 3D visualization, and stereo imaging." ACM Transactions on Multimedia Computing, Communications, and Applications (TOMM) 3.4 (2007): 6.*

(Continued)

*Primary Examiner* — Daniel F Hajnik
(74) *Attorney, Agent, or Firm* — Jaffery Watson Mendonsa & Hamilton LLP

(57) ABSTRACT

Embodiments described herein provide for blind spot rendering optimizations for eye tracking head mounted displays. One embodiment provides an apparatus comprising first logic to receive eye-tracking data from an eye tracking system, second logic to determine a blind spot region for a scene based on the eye tracking data, and third logic to provide identifying data for the blind spot region to a renderer. The renderer is configured to render pixels of the scene that fall within the blind spot region at a lower rendering quality relative to the remainder of the scene.

25 Claims, 22 Drawing Sheets

(56) References Cited

U.S. PATENT DOCUMENTS

2014/0247277 A1* 9/2014 Guenter .................. G06T 11/00
  345/611
2016/0131909 A1* 5/2016 Nakamura ......... G02B 27/0172
  345/8
2016/0350965 A1* 12/2016 Lum ....................... G06T 11/40

OTHER PUBLICATIONS

PCT International Search Report and Written Opinion of the International Searching Authority for International Application No. PCT/US2017/042870, dated Oct. 20, 2017, 13 pages.

\* cited by examiner

FIG. 9A — GRAPHICS PROCESSOR COMMAND FORMAT 900

FIG. 9B — GRAPHICS PROCESSOR COMMAND SEQUENCE 910

BLIND SPOT RENDERING OPTIMIZATIONS FOR EYE TRACKING HEAD MOUNTED DISPLAYS

TECHNICAL FIELD

Embodiments generally relate to graphics processing logic. More particularly, embodiments relate to blind spot rendering optimizations for head mounted displays including eye tracking.

BACKGROUND

A binocular head mounted display (HMD) is a display device that can be used to present stereoscopic images to a user, enabling a virtual reality (VR) environment. Rendering stereoscopic images and performing any necessary processing on those images before display may be computational intensive for complex scenes. As screen resolutions for head-mounted displays (HMDs) increase, the computational resources required to render images for the display also increase.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
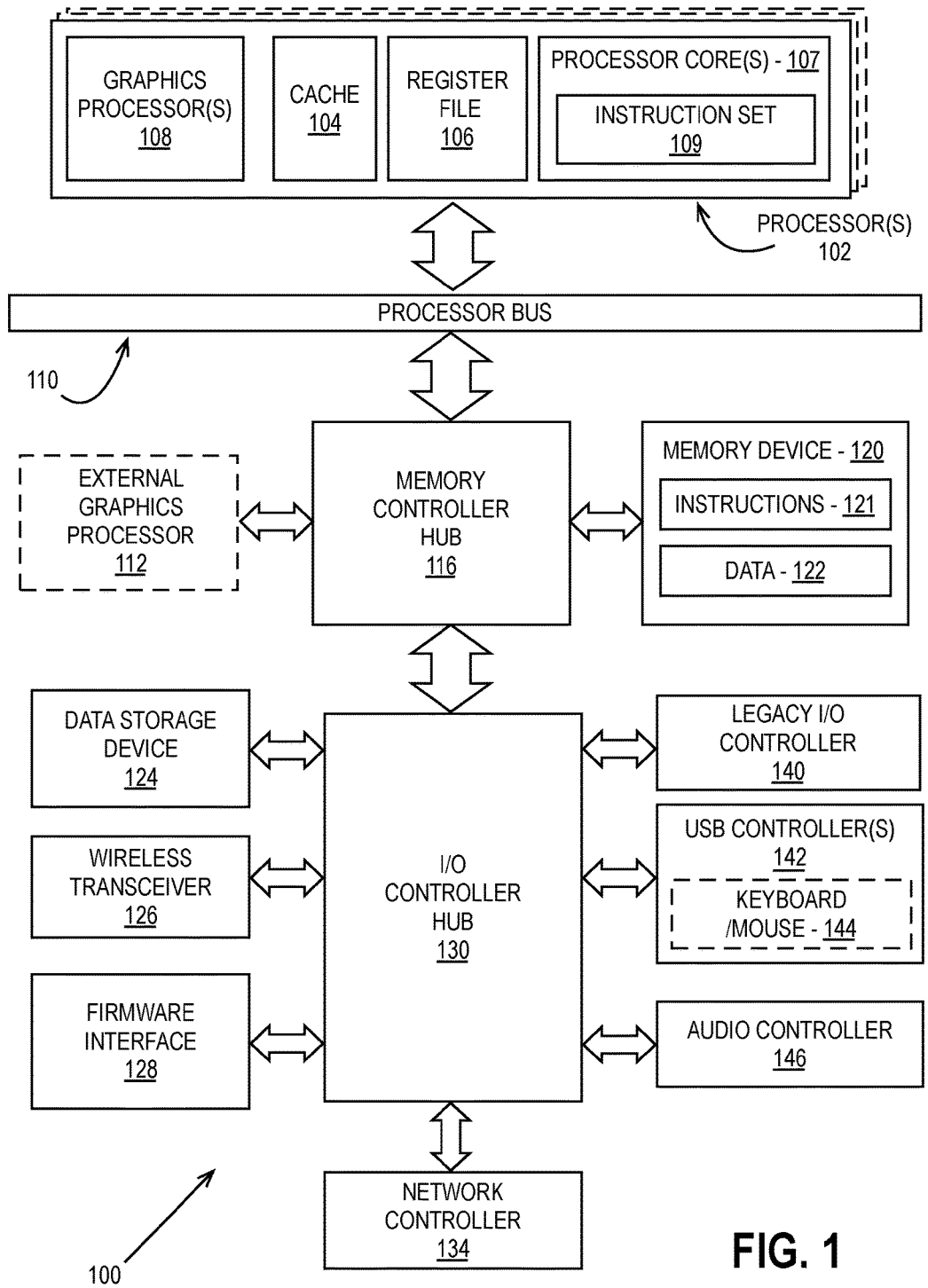
FIG. 1 is a block diagram of an embodiment of a computer system with a processor having one or more processor cores and graphics processors.

Embodiments described herein provide various techniques to compensate for the high computational requirements of rendering and presenting a virtual reality scene by making use of eye tracking data from a head mounted display. In one embodiment, eye-tracking data is used to determine a blind spot region of a scene. The blind spot region is a region of the scene that falls within a blind spot of the user's visual field. As the blind spot regions will not be perceived by the eyes of the user, rendering quality for portions of a scene corresponding with a blind spot region can be significantly reduced. The blind spot rendering optimizations can be combined with foveated rendering techniques, such that only the portions of the scene which can be perceived with the highest visual acuity are rendered at full quality, while regions of the scene that will not be perceived are rendered at significantly reduced quality.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, the techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the description that follows, FIGS. 1-12 provide an overview of exemplary data processing system and graphics processor logic that incorporates or relates to the various embodiments. FIGS. 13-22 provide specific details of the various embodiments. Although some of the following embodiments are described with reference to a graphics processor, similar techniques and teachings can be applied to other types of circuits or semiconductor devices, including general-purpose processors (e.g., CPUs) or many integrated core processors, as the teachings are applicable to any processor or machine that manipulates or processes image or vertex data.

System Overview

FIG. 1 is a block diagram of a processing system 100, according to an embodiment. In various embodiments, the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
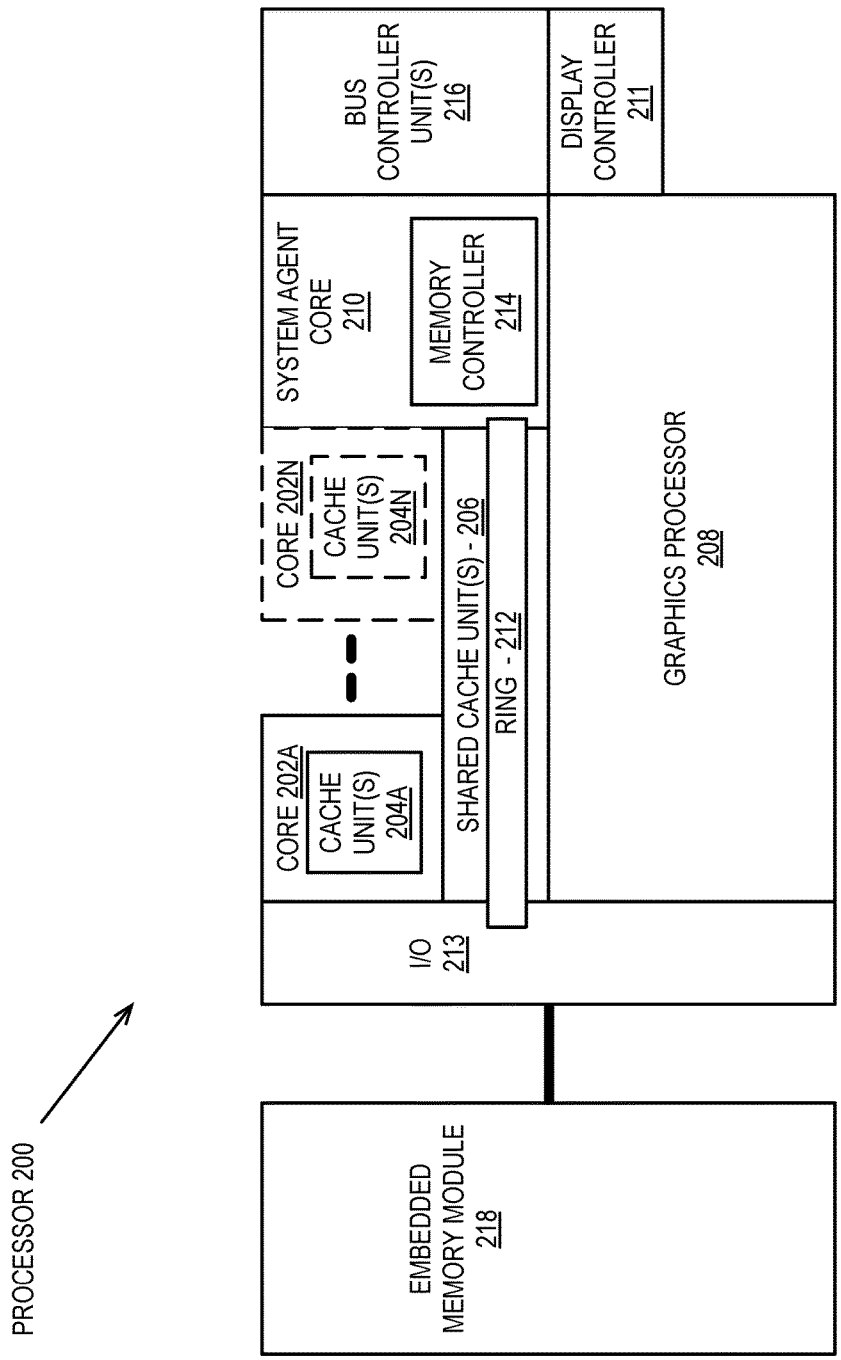
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
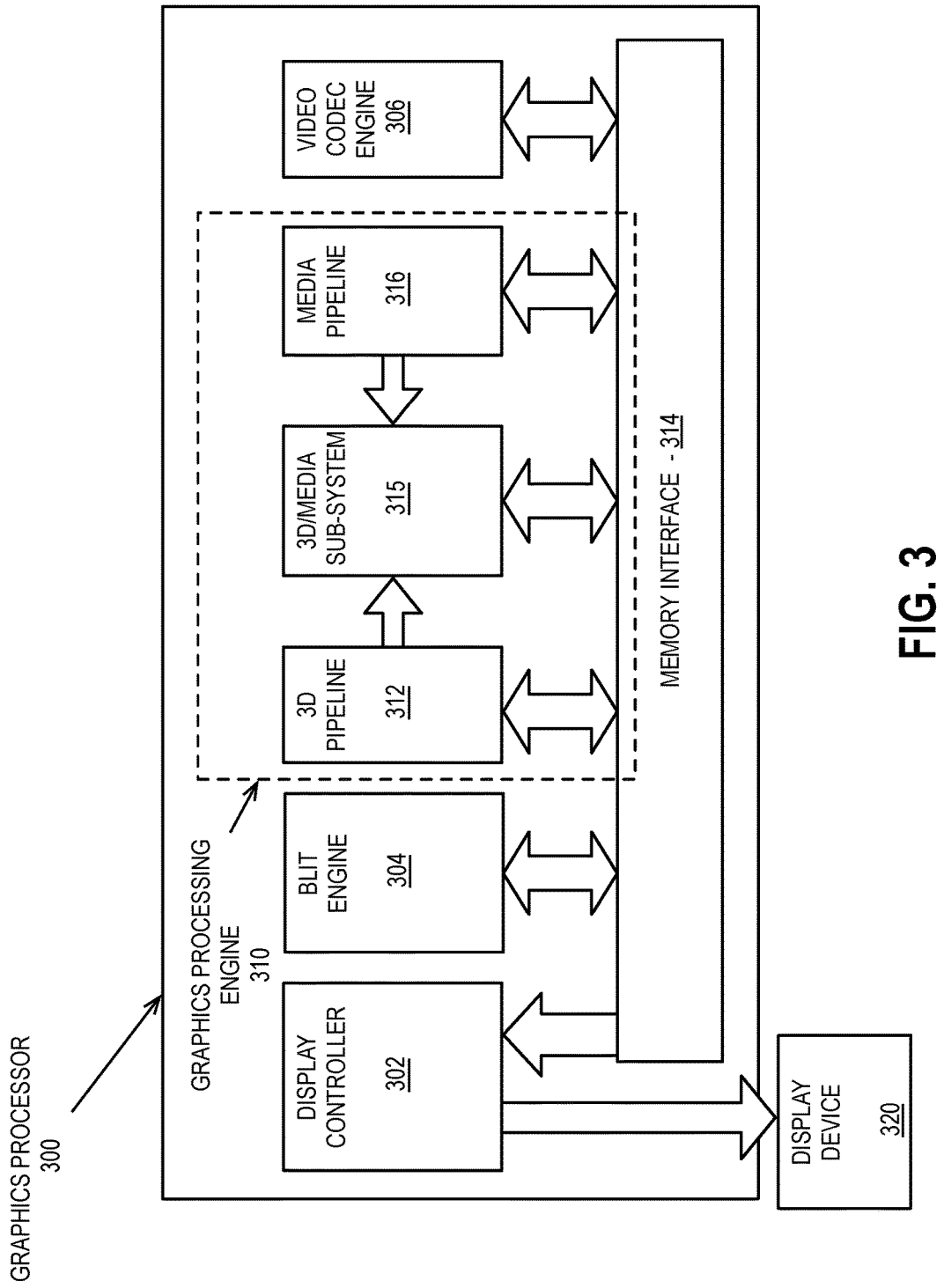
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
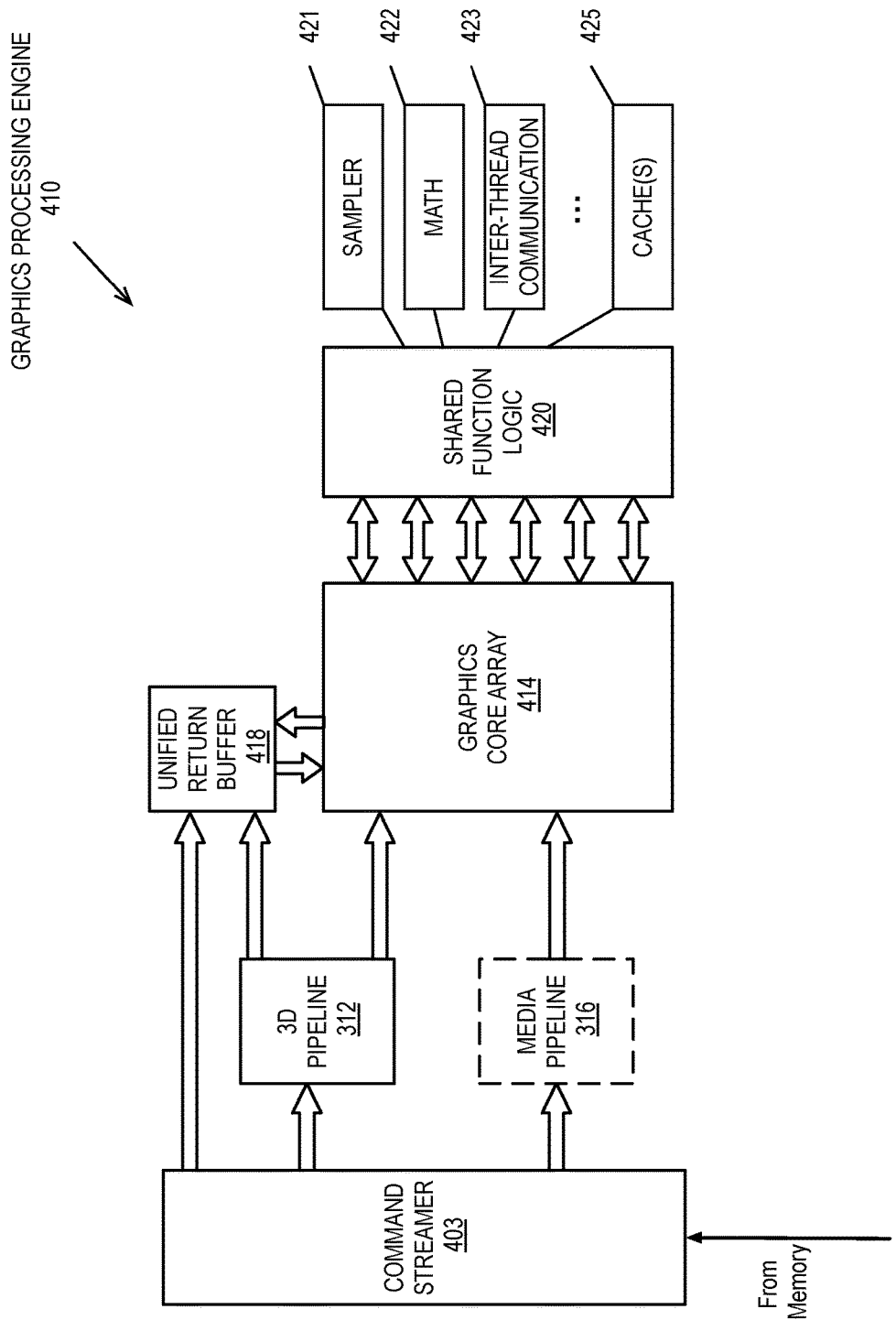
FIG. 4 is a block diagram of an embodiment of a graphics processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
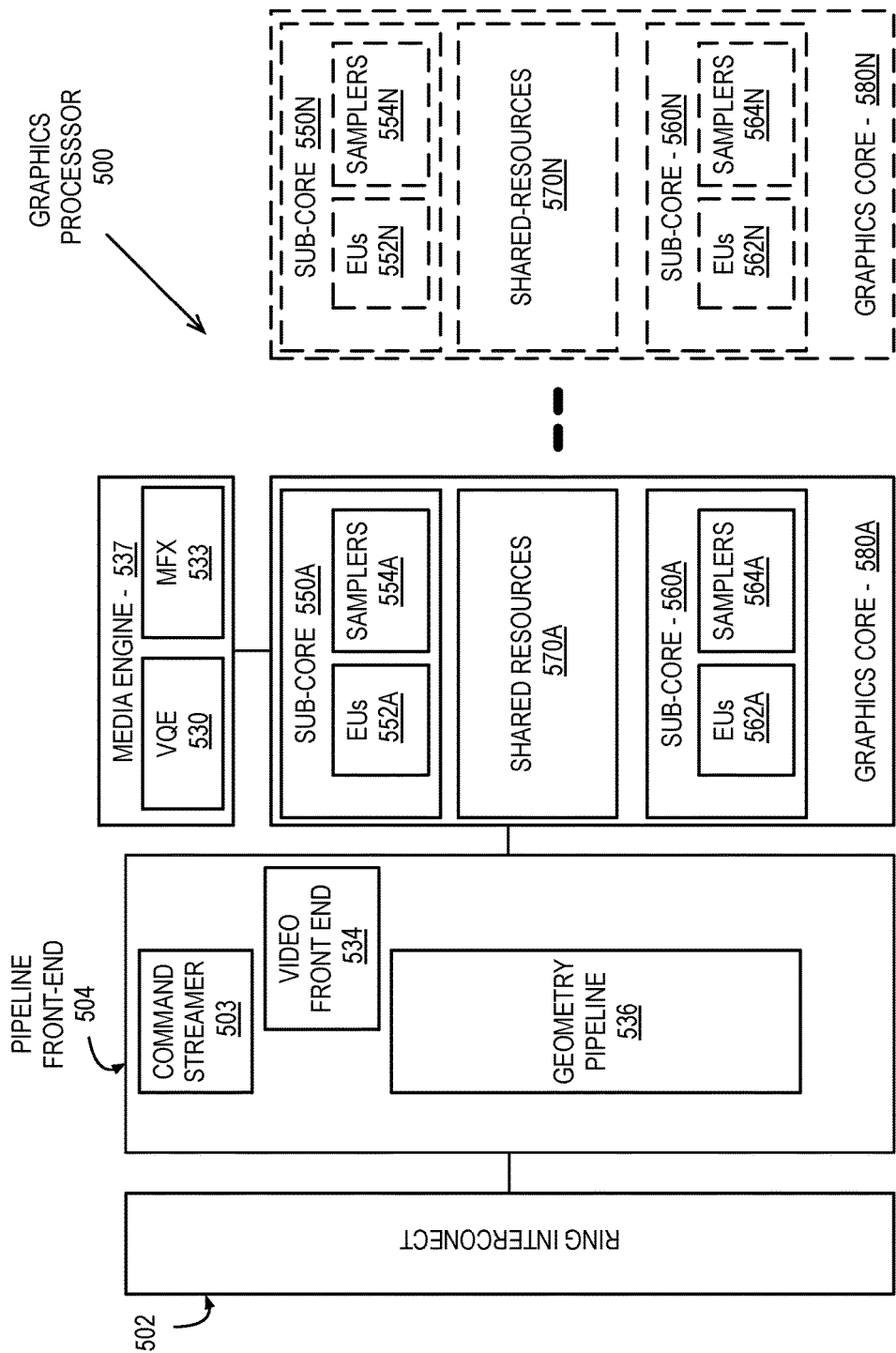
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
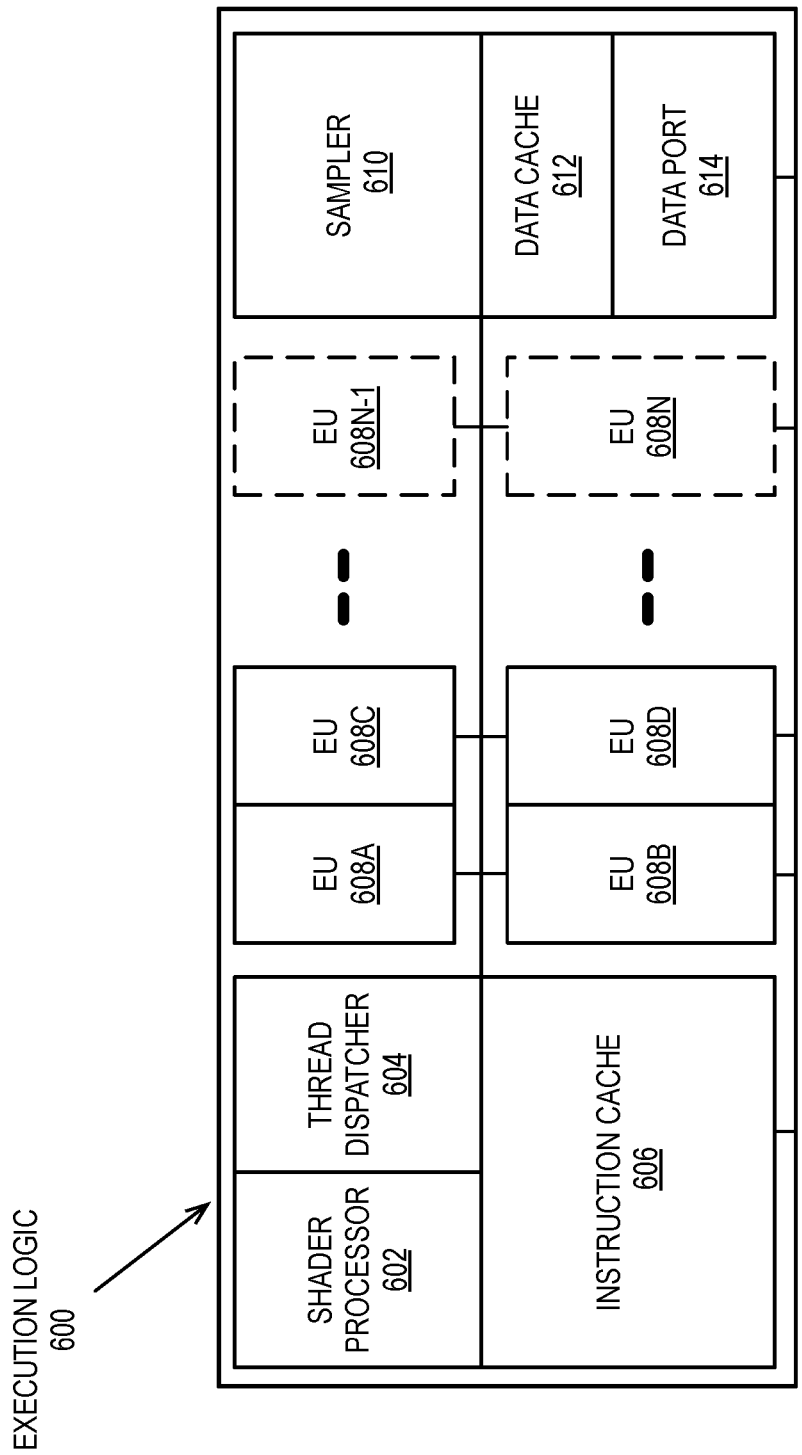
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
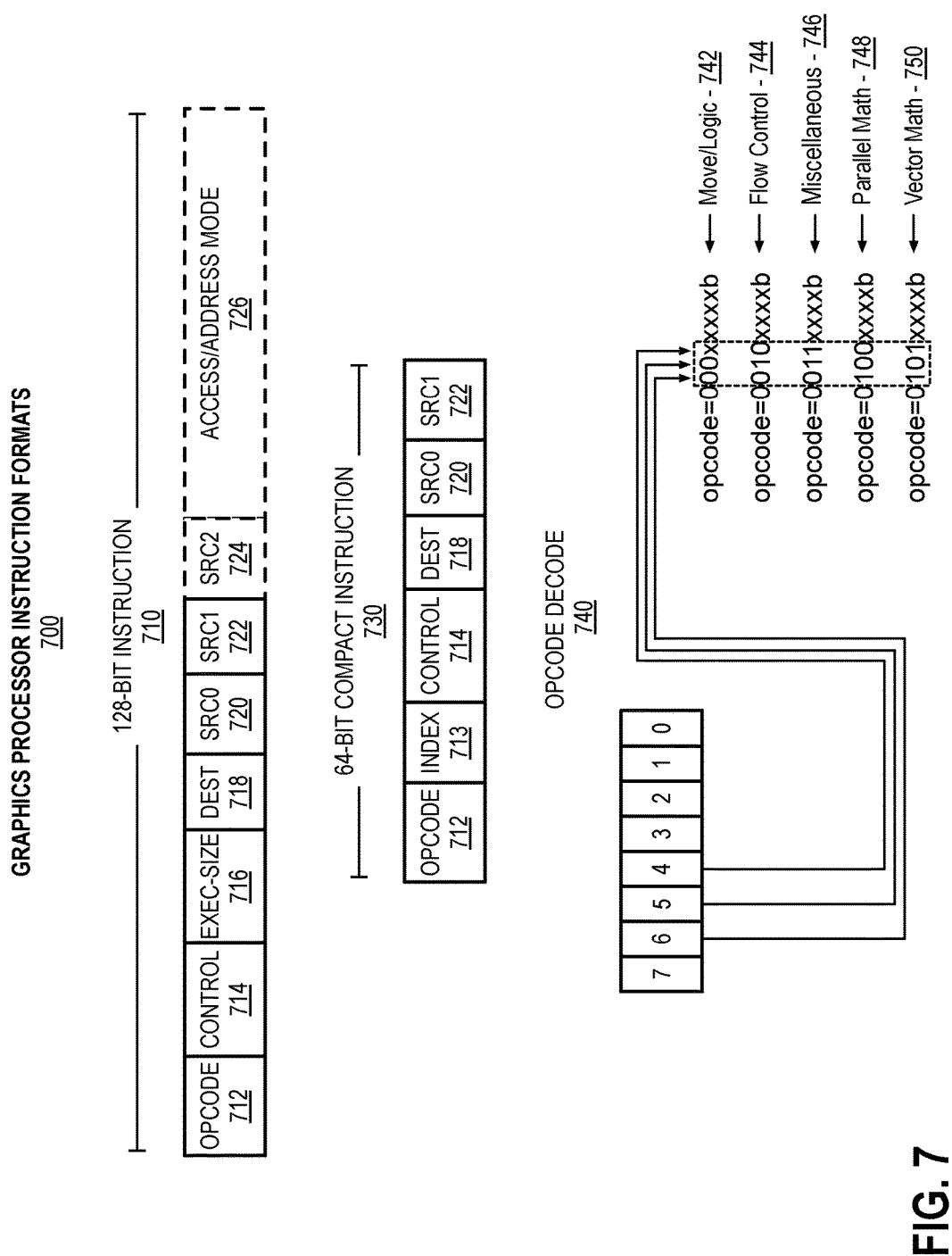
FIG. 7 illustrates a graphics processor execution unit instruction format according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit instruction format 730. The native instructions available in the 64-bit instruction format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
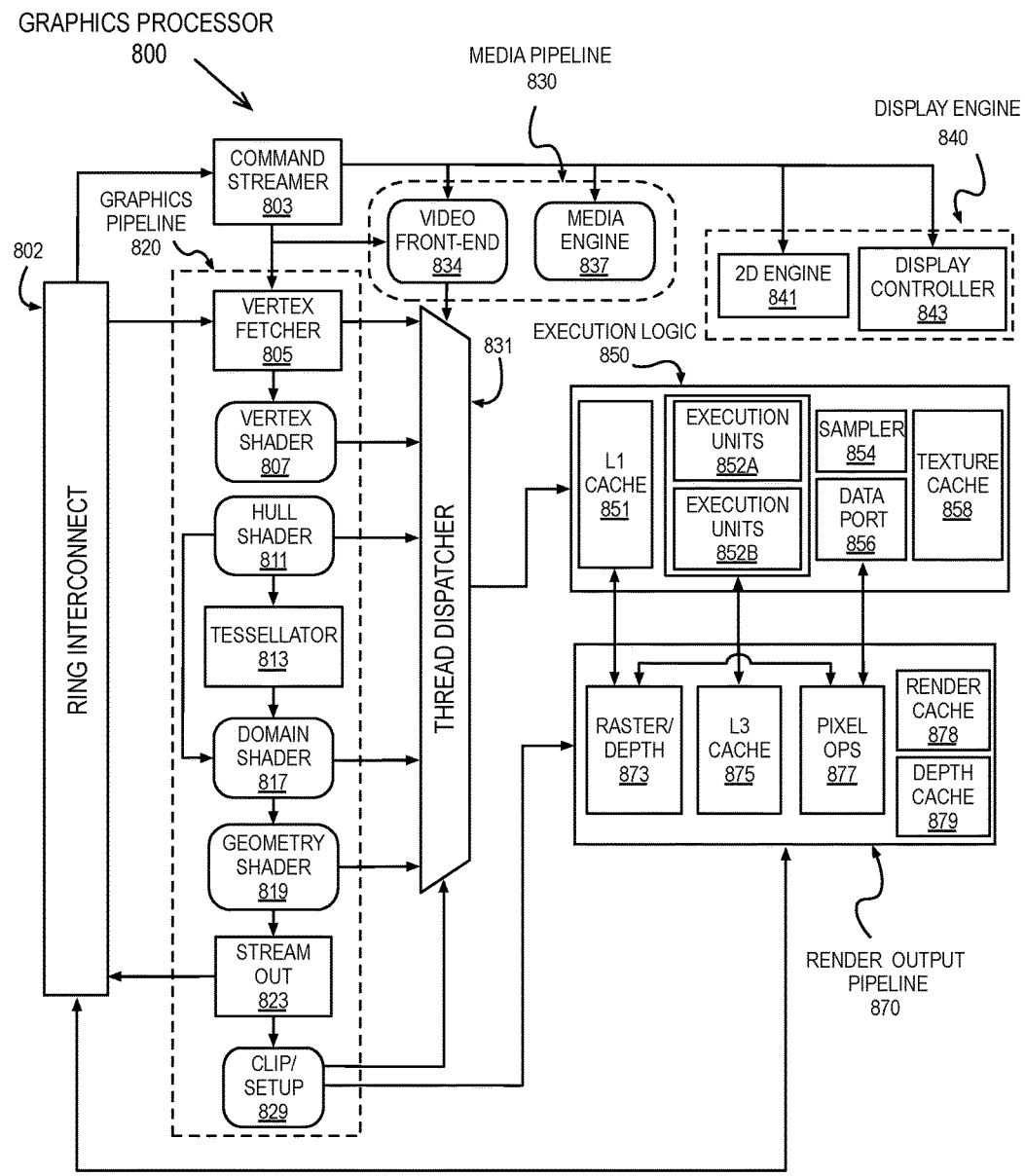
FIG. 8 is a block diagram of another embodiment of a graphics processor which includes a graphics pipeline, a media pipeline, a display engine, thread execution logic, and a render output pipeline.
Figure 9:
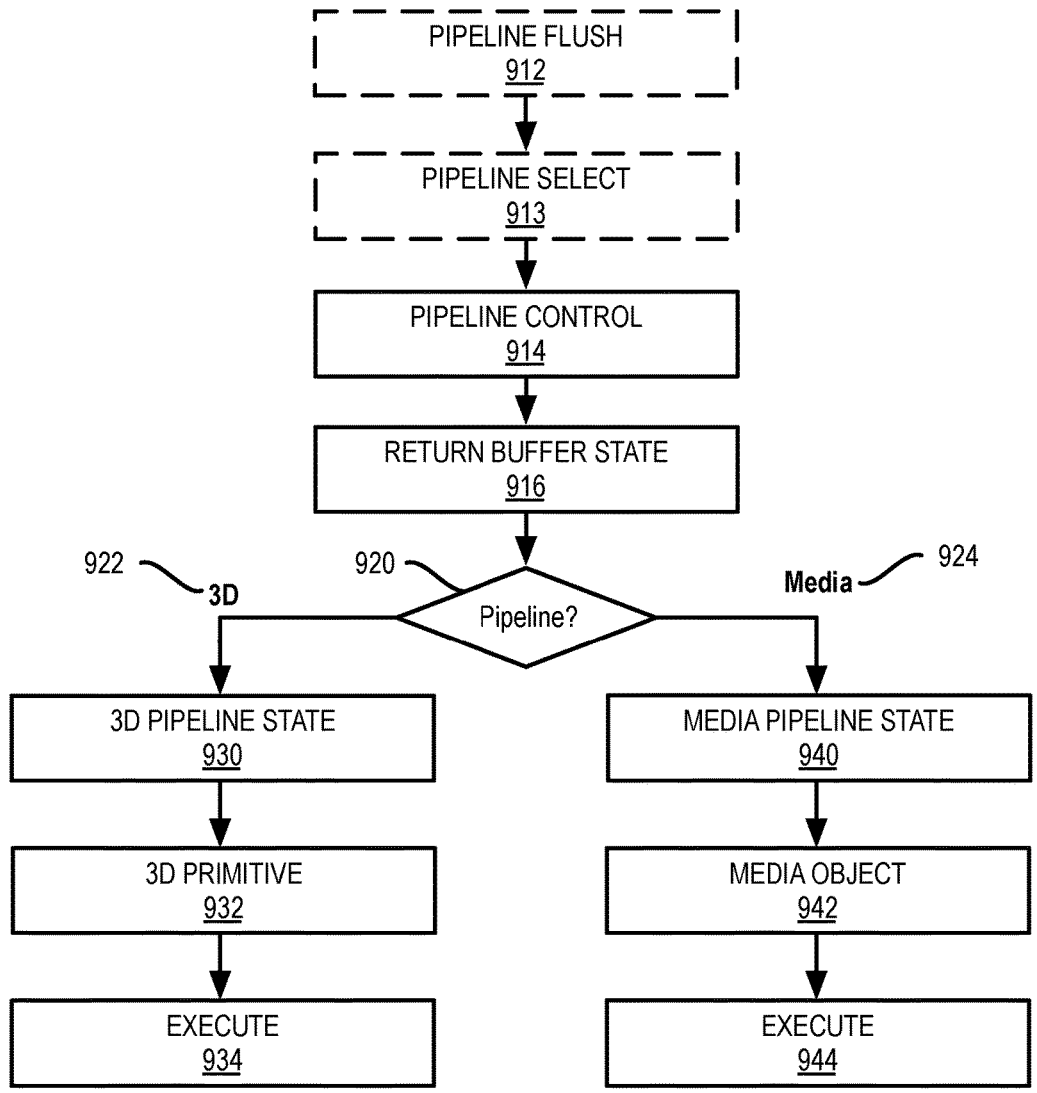
FIG. 9A is a block diagram illustrating a graphics processor command format according to an embodiment.
FIG. 9B is a block diagram illustrating a graphics processor command sequence according to an embodiment.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a depth test component and rasterizer 873 that converts vertex-based objects into an associated pixel-based representation. In some embodiments, the render output pipeline 870 includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, commands for the return buffer state 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, configuring the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
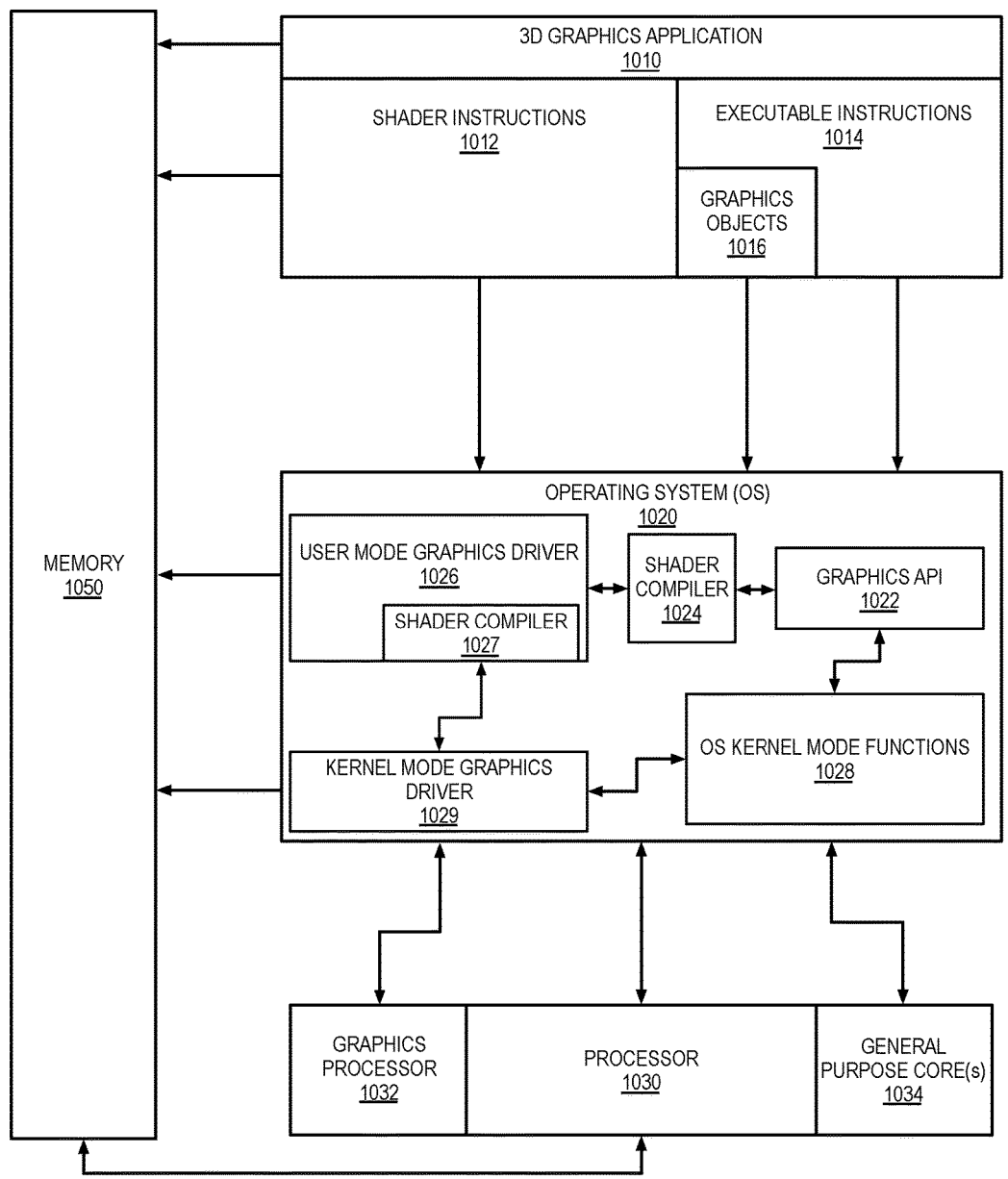
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core(s) 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API or the OpenGL API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
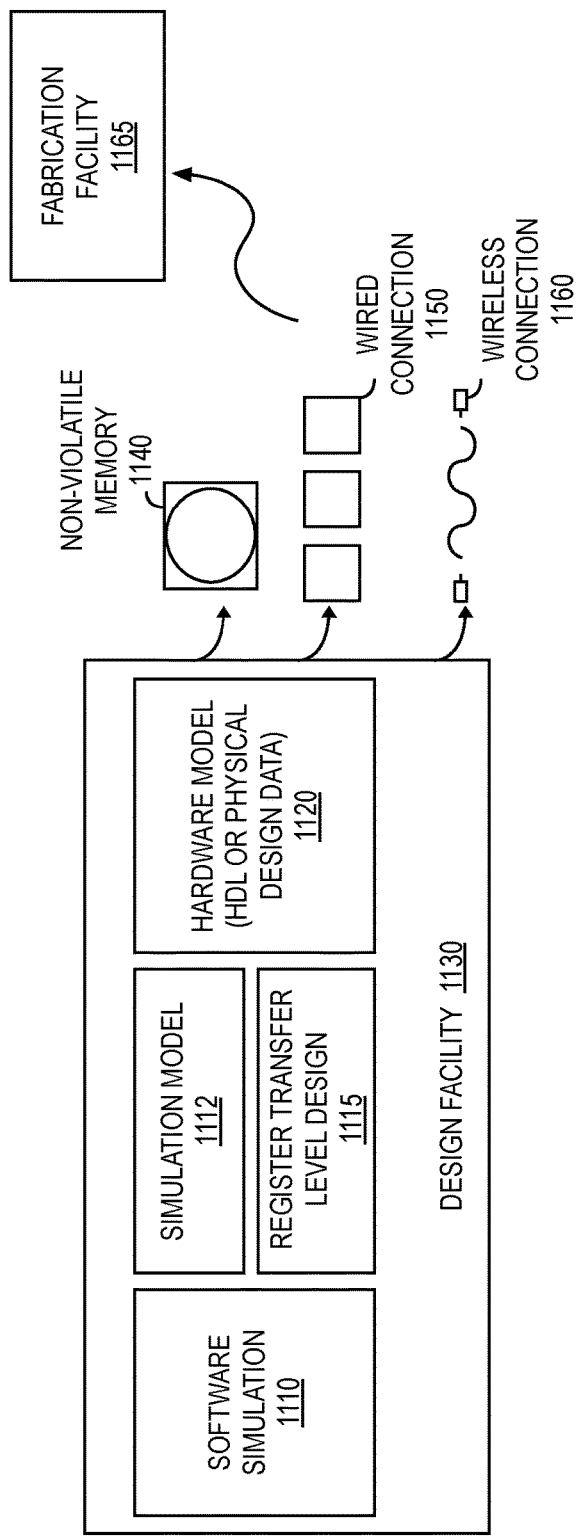
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3$^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Exemplary System on a Chip Integrated Circuit

Figure 12:
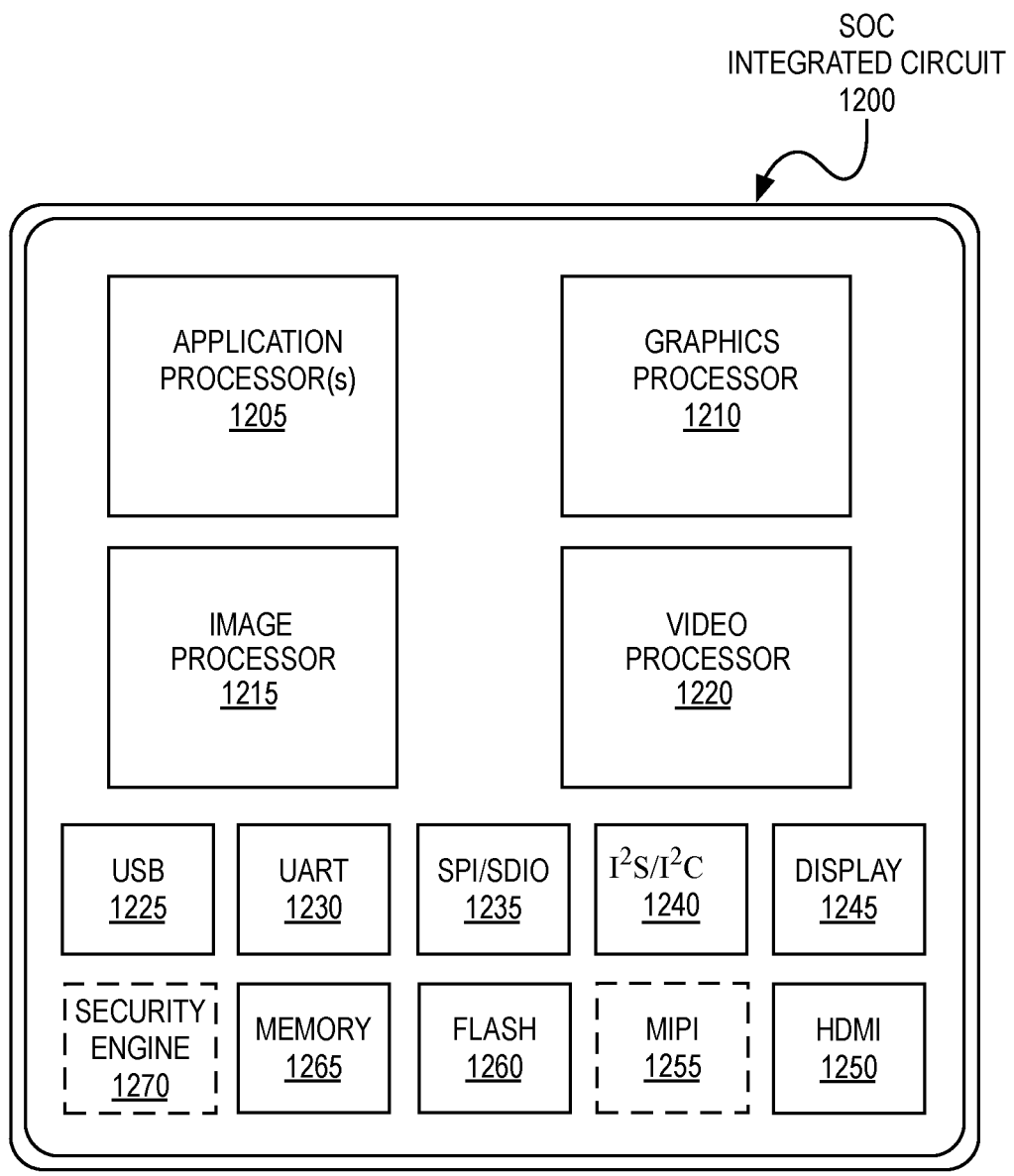
FIG. 12 is a block diagram illustrating an exemplary system on a chip integrated circuit that may be fabricated using one or more IP cores, according to an embodiment.
Figure 13:
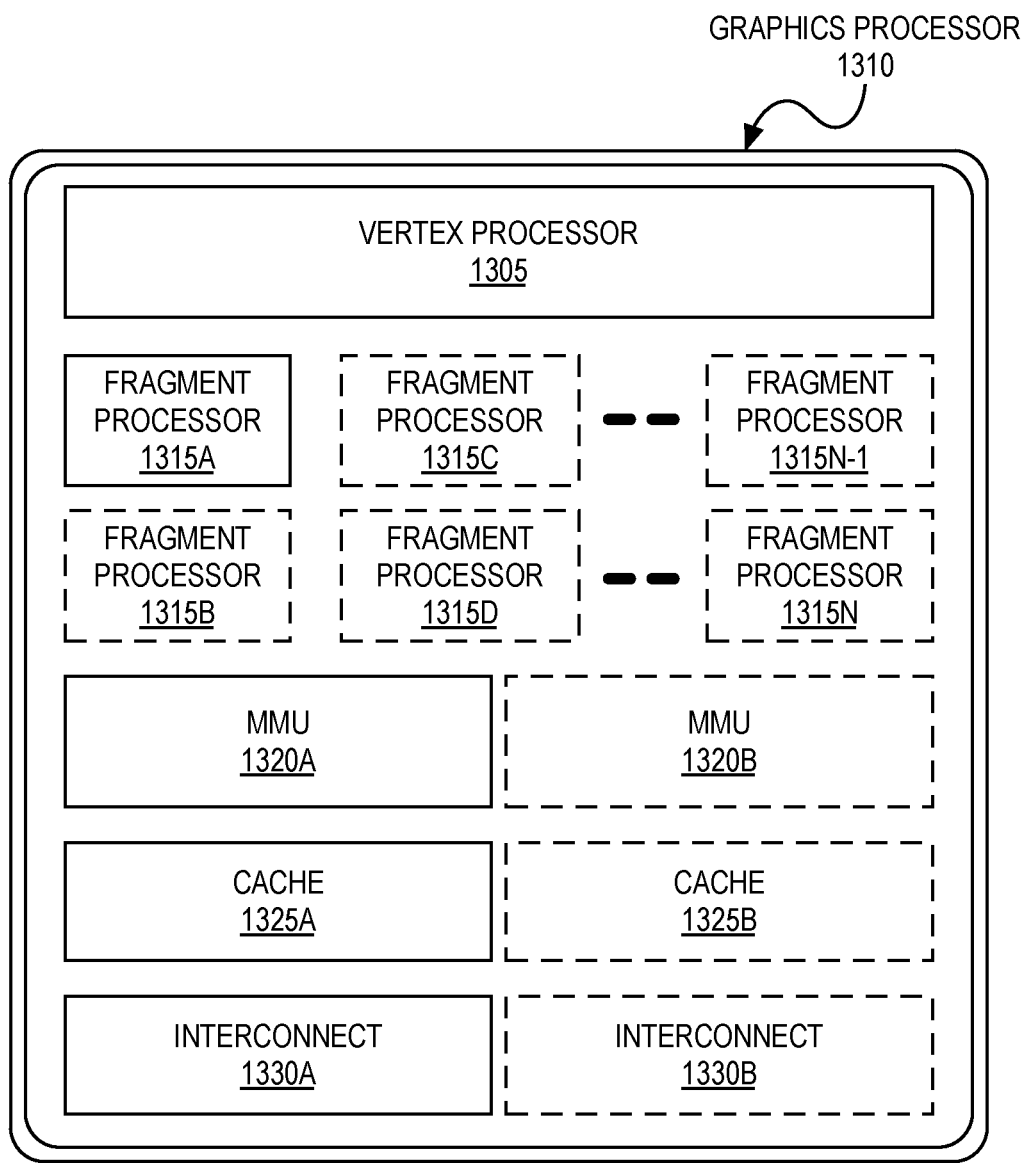
FIG. 13 is a block diagram illustrating an exemplary graphics processor of a system on a chip integrated circuit.
Figure 14:
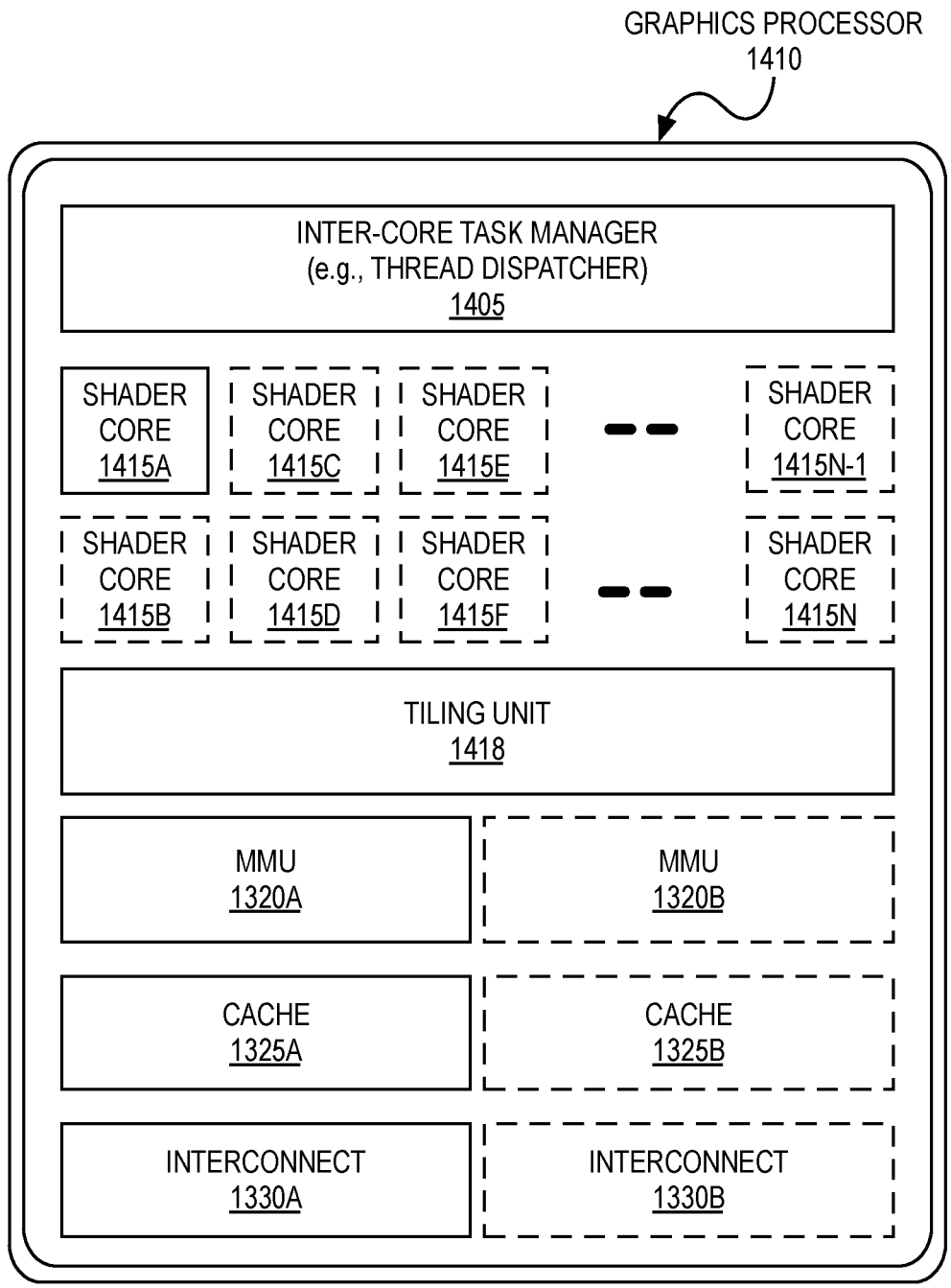
FIG. 14 is a block diagram illustrating an additional exemplary graphics processor of a system on a chip integrated circuit.

FIGS. 12-14 illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 13 is a block diagram illustrating an exemplary graphics processor 1310 of a system on a chip integrated circuit that may be fabricated using one or more IP cores, according to an embodiment. Graphics processor 1310 can be a variant of the graphics processor 1210 of FIG. 12. Graphics processor 1310 includes a vertex processor 1305 and one or more fragment processor(s) 1315A1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

FIG. 14 is a block diagram illustrating an additional exemplary graphics processor 1410 of a system on a chip integrated circuit that may be fabricated using one or more IP cores, according to an embodiment. Graphics processor 1410 can be a variant of the graphics processor 1210 of FIG. 12. Graphics processor 1410 includes the one or more MMU(s) 1320A-1320B, cache(s) 1325A-1325B, and circuit interconnect(s) 1330A-1330B of the integrated circuit 1300 of FIG. 13.

Graphics processor 1410 includes one or more shader core(s) 1415A-1415N (e.g., 1415A, 1415B, 1415C, 1415D, 1415E, 1415F, through 1315N-1, and 1315N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1410 includes an inter-core task manager 1405, which acts as a thread dispatcher to dispatch execution threads to one or more shader core(s) 1415A-1415N. Graphics processor 1410 additionally includes a tiling unit 1418 to accelerate tiling operations for tile-based rendering, in which rendering operations for a scene are subdivided in image space. Tile-based rendering can be used to exploit local spatial coherence within a scene or to optimize use of internal caches.

Blind Spot Rendering Optimizations in Eye Tracking Head Mounted Displays

Embodiments described herein extend foveated rendering techniques by enabling blind spot rendering optimizations for use in HMDs that include eye-tracking sensors. In one embodiment, eye tracking data is used to determine the portion of a scene that will fall within the foveal region of the visual system of the wearer of the HMD where the foveal regions define the visual regions associated with each eye in which visual acuity is highest. As the blind spot region for each eye is a fixed region offset from the fovea, the portions of the image that will fall within the blind spot of the user's vision can be determined relative to the fovea of each eye. Once the blind spot is determined, a mapping of the relative quality in which to render a scene can be generated. Processing logic can then vary the quality and/or complexity of a rendered scene based on the relative quality mapping.

In one embodiment amount of detail in which should be rendered on a per-pixel base can be either expressed in the form of equations that can be used to calculate a variation on relative detail based on a distance from the center of the field of view for each eye. For example, given a blind spot region having a center of (x1, y1), to test if a pixel (x2, y2) is in the blind spot region having a radius R, the distance D between the pixel and the center of the blind spot region can be determined based on the Pythagorean theorem, such that:

$$D=\sqrt{(x2-x1)^2+(y2-y1)^2}$$

For a blind spot region having a radius R, the tested pixel is in the blind spot region if D<=R. Were multiple sub-regions of the blind spot region are defined, a pixel can be tested against different radii (e.g., R1, R2, etc.).

In one embodiment, a sampling map can be generated to express a relative drop in quality from the center of the field of view of an eye. Both equation based rendering and sample map based rendering can incorporate blind spot determination as described herein to enhance the rendering efficiency for a scene by reducing quality in areas of the scene that fall within one or more blind spots of the field of view of the user of the head mounted display.

In addition to adjusting rendering quality, pre-processing quality for scenes viewed on a head mounted display can be adjusted based on the sample map. For example, some head mounted displays display a scene to a wearer through wide-angle lenses that provide a sharper image near the center of the lens. The sampling map can also be used during a pre-warp phase to enhance pre-processing quality for areas of a scene that will be viewed through the center of the lens and reduce quality for areas of the scene that will be blurred by lens distortion.

Various rendering techniques can benefit from blind spot rendering optimizations, including but not limited to ray-tracing, rasterization, and/or hybrid ray-tracing and rasterization techniques. Additionally, blind spot optimization can be applied generally to volume renderers including volume ray casters, as well as point-based renderers, and 2D sprite renderers. Blind spot optimization can also be applied at various points of the rendering pipeline, including during a primary shading pass or in conjunction with anti-aliasing operations. For example, the quality of rasterization or ray-tracing anti-aliasing can be adjusted based on blind spot optimizations. Additionally, blind spot optimizations can be applied to multi-resolution shading techniques such as coarse pixel shading, in which the granularity of pixel shader operations can be optimized based on a blind spot determination. For example, the shading granularity associated with a blind spot region can be significantly reduced without a noticeable loss in visual quality for a scene.

Figure 15:
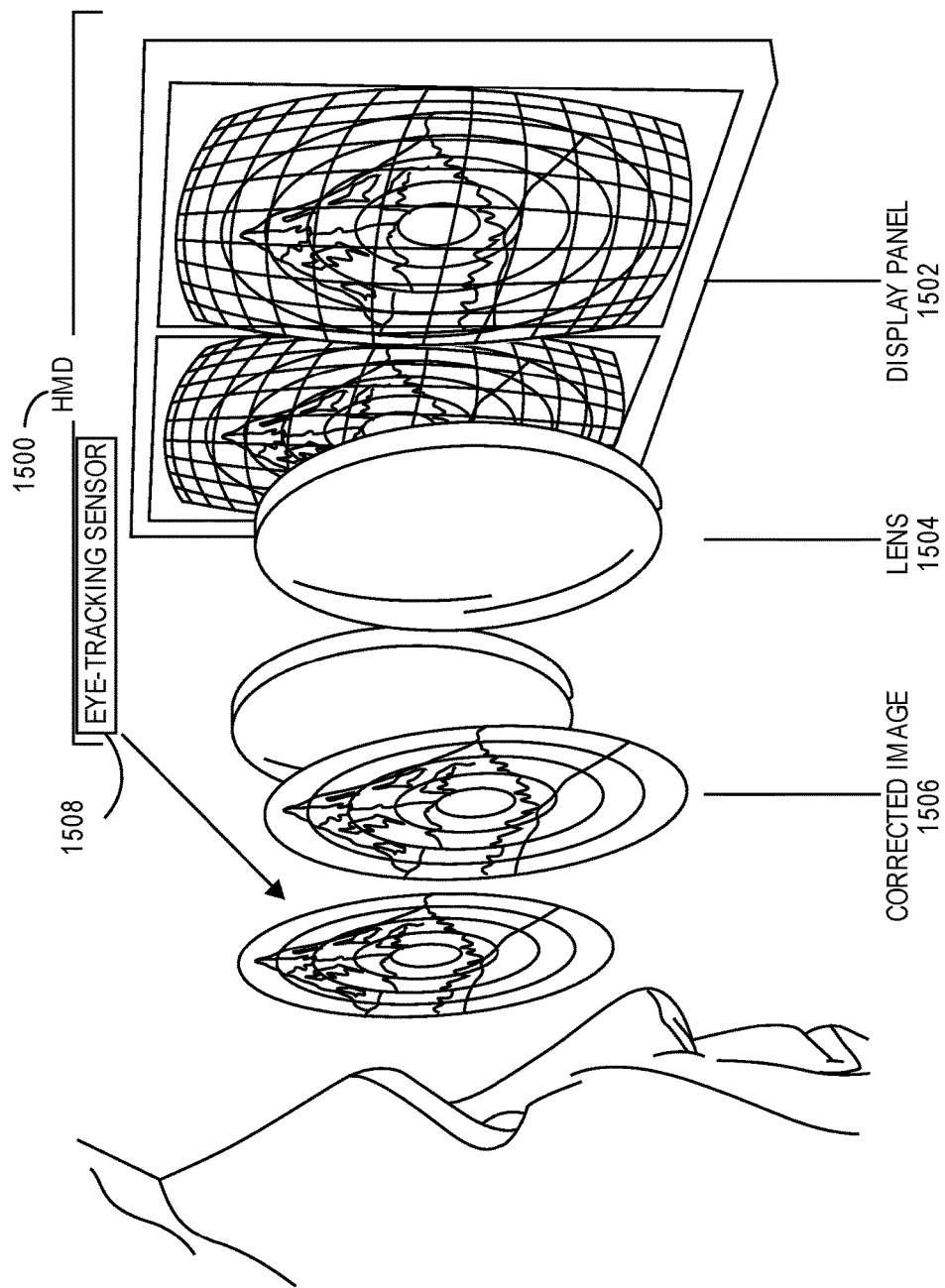
FIG. 15 is an illustration of components of a head mounted display system, according to an embodiment.

FIG. 15 is an illustration of components of a head mounted display system 1500, according to an embodiment. In one embodiment the head mounted display system 1500 includes a display panel 1502 and a lens 1504 through which the display panel 1502 is viewed. The scene displayed via the display panel 1502 can be pre-corrected (e.g., pre-warped) to compensate for radial distortion and chromatic aberration caused by the lens 1504. When the pre-corrected scenes are displayed on the display panel 1502 of the head mounted display system 1500, the user perceives a corrected image 1506. In one embodiment, distortion and aberration correction is performed as described in application Ser. No. 14/316,322 for Distortion Meshes Against Chromatic Aberrations, filed Jun. 26, 2014, which is hereby incorporated herein by reference.

In one embodiment, the head mounted display system 1500 includes an eye tracking system including at least one eye-tracking sensor 1508. In one embodiment the eye-tracking sensor 1508 includes an image-sensing component that is focused on one or more eyes of a user of the head mounted display system 1500. The eye-tracking sensor 1508 can provide a signal to hardware or software logic of the eye tracking system, which performs recognition on the incoming signal to recognize an orientation of one or more eyes of the user. The incoming signal can be an analog or digital signal. Pattern recognition can be performed on the incoming signal using one or more image processing or object recognition techniques known in the art. The orientation or position of at least one eye of the user can be identified and used to determine a location on the display panel 1502 that corresponds with the center of the field of view of the user.

Various eye tracking techniques can be used and the embodiments described herein are not limited to any particular eye tracking system, technique or algorithm. For example, a pupil center corneal reflection (PCCR) technique can be used, or an alternate method of optical eye tracking using near-infrared or visible light. In some embodiments, electric potential measurement based techniques or eye-attached tracking can be used. In each system, eye-tracking information is provided to the rendering system at a sufficient frequency and at sufficiently low latency to determine an accurate center of view before rendering each frame. The appropriate blind spot coordinate data, equation coefficients, or sample map can then be determined for each scene before the scene is rendered.

In one embodiment, high frequency eye tracking data is provided to the rendering system at a multiple of the frame rate of the display. Tracking eye-movement at a multiple of the frame rate or refresh rate of the display can enable just-in-time sampling of eye tracking data, which may improve the accuracy of the center of view determination for the scene.

Figure 16:
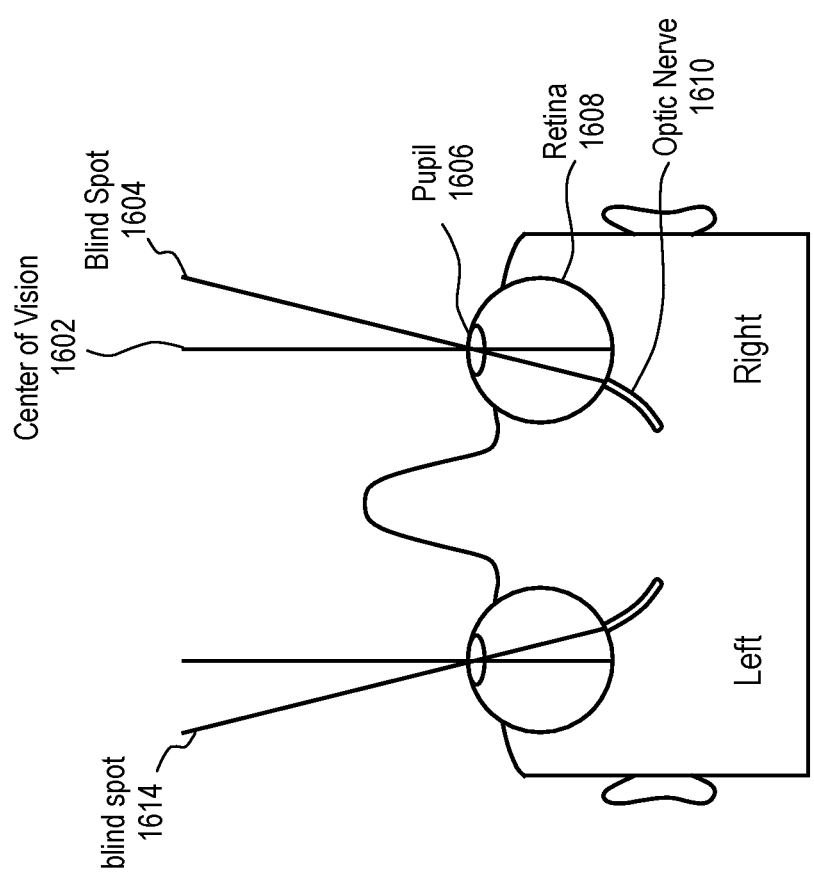
FIG. 16 is an illustration of a blind spot within a visual field.

FIG. 16 is an illustration of a blind spot within a visual field. When a user views a scene presented via a head mounted display, at least a portion of the scene will fall within a blind spot of the visual field of the user. In general, the highest visual acuity for the user will be based around the center of vision 1602, which lies within the field of vision for each eye that is centered upon the pupil 1606 of the eye. The higher visual acuity of the center of vision 1602 is due to the higher concentration of visual receptors that lie in the fovea centralis of the retina 1608.

To the contrary, a blind spot 1604 lies within the field of view associated with an attachment point of the optic nerve 1610, which does not contain image receptors. Due to the lack of image receptors, the portion of the field of view corresponding with the blind spot 1604 is invisible, but is interpolated based on surrounding detail and information from the opposite eye.

In one embodiment, rendering efficiency can be increased by bypassing the rendering of portions of a scene associated with the blind spot 1604 or by reducing the visual quality of the region. This optimization can be performed without an apparent loss of visual quality due to visual system compensation, for example, by relying on the scene presented to the opposite eye.

For most users the blind spot 1604 is located about 12° to 15° temporally and 1.5° below the horizontal in the field of view for an eye. The blind spot covers a portion of the field of vision that is approximately 7.5° high and 5.5° wide. For a stereoscopic head mounted display, each scene will have separate, opposite blind spots. For example, the blind spot 1604 in FIG. 16 is illustrated for the right eye. A left blind spot 1614 is also present for the left eye, which lies at an opposing angle in the field of view relative to the blind spot 1604 of the right eye.

The equation coefficients or sample maps associated with the blind spot region will different for each eye when multiple stereo scenes are rendered for a stereoscopic display. In one embodiment, the blind spot region of a scene can be independently determined for each eye. In one embodiment the blind spot region can be determined for a single eye and the blind spot region for the opposite eye can be calculated based on the determined blind spot region. For example, a sample map can be generated that includes a low quality region for the blind spot 1604 associated with the right eye. The blind spot region of the left eye can then be determined based on the determined blind spot for the right eye.

Figure 17:
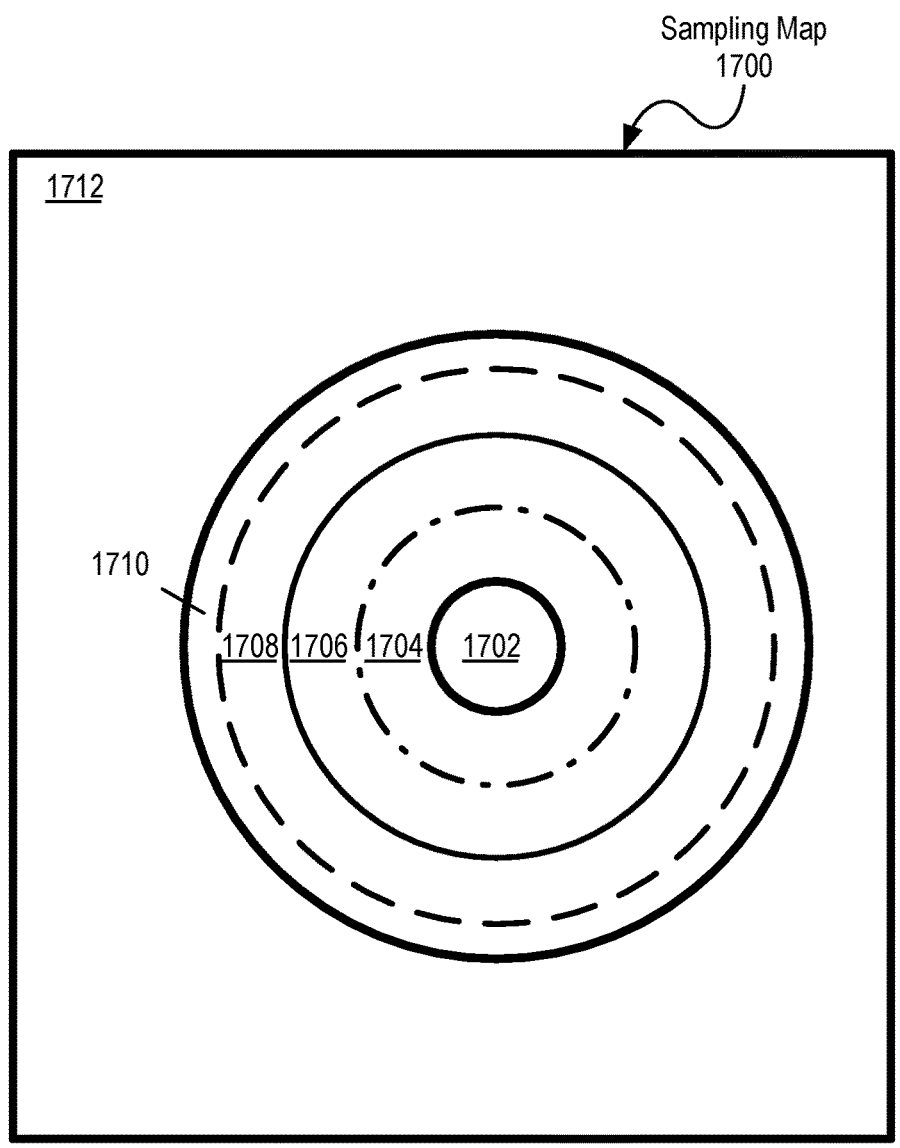
FIG. 17 is an illustration of a sampling map for rendering a scene for an eye of a head mounted display.

FIG. 17 is an illustration of a sampling map 1700 for rendering a scene for an eye of a head mounted display. In one embodiment the sampling map 1700 includes multiple regions that specify multiple rendering quality settings for the scene. The sampling map 1700 can be generated dynamically based on eye tracking information provided by an eye tracking system, and can also be adjusted based on the distortion introduced by the viewing lenses of the head mounted display (e.g., lens 1504 of FIG. 15). For example, for each frame, the sampling map 1700 can include at least a central region 1702 associated with the center of the field of view, and one or more additional regions (e.g., region 1704, region 1706, region 1708, region 1710) that radially define successively lower quality rendering regions based on successively lower visual acuity at which a user can perceive the respective regions of the scene. In one embodiment, an additional region 1712 is defined that includes the remainder of the scene that falls outside of the lowest quality radial region (e.g., region 1710).

The sampling map 1700 can define a bitfield in which higher values are associated with higher rendering quality. Higher sample map values will be found in the center of the detected field of view, with lower sample map values in each region radiating from the center. In one embodiment an interpolated sampling map can be derived in which one or more regions of the sampling map 1700 are blended into a single region. For example, rendering quality data can be interpolated between regions 1704-1706 and regions 1708-1710. In one embodiment, a separate sample map can be maintained for each eye. In one embodiment, a single sampling map can be defined for one eye and one or more regions of the sampling map can be differently interpreted for the opposing eye.

Figure 18:
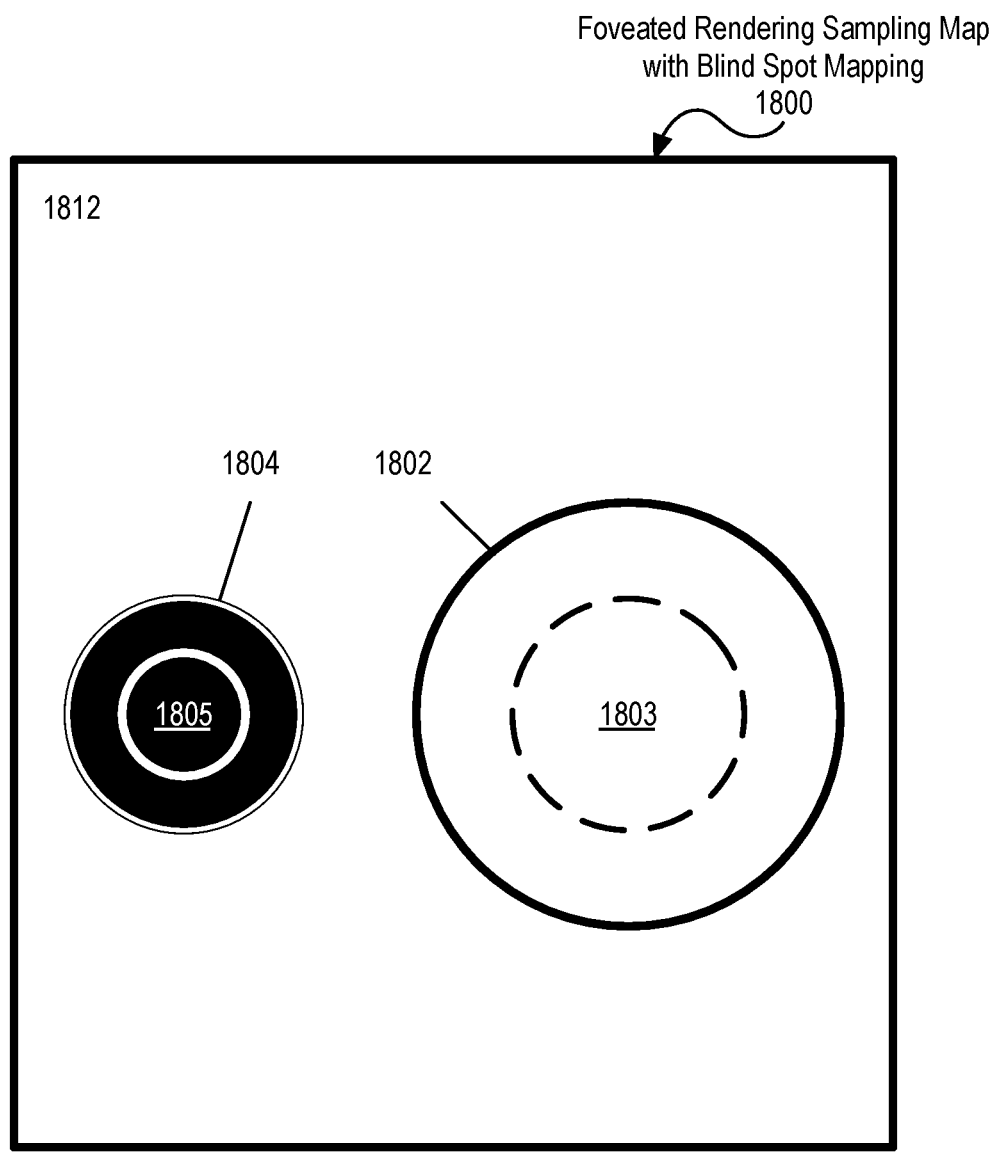
FIG. 18 is an illustration of a foveated rendering sampling map with blind spot mapping, according to an embodiment.

FIG. 18 is an illustration of a foveated rendering sampling map with blind spot mapping 1800, according to an embodiment. In one embodiment a sampling map can be generated to enable a fovated rendering technique in which a scene has a baseline quality region 1812, a high quality region 1802, and a blind spot region 1804. The baseline quality region 1812 applies to the portion of the scene that are neither enhanced in quality nor reduced in quality. In some head mounted display implementations, the baseline quality region may encompass the majority of the scene. The high quality region 1802 is associated with the portion of the scene that has been determined to be in the center of the visual field of the eye associated with the scene. Portions of the scene that fall within the high quality region 1802 can be rendered, pre-processed, or post-processed at a higher quality than other regions of the scene. The blind spot region 1804 defines a portion of the scene in which rendering can be performed at low quality or, in some circumstances, bypassed entirely, as that portion of the scene will not be directly perceived by the eye. When bypassing rendering for a blind-spot region, previously rendered pixels for the region from the previous frame may be re-used to avoid luminance changes in the region between frames.

Where the rendering quality for the regions is described in terms of high quality or low quality, these quality levels are intended to be relative. Additionally, different quality levels may be found within a given region. For example and in one embodiment, the differing quality regions illustrated in FIG. 17 can be used within the high quality region 1802 and/or the blind spot region 1804. The high quality region 1802 can include sub-regions of high quality and very high quality relative to a baseline quality (e.g., the quality associated with the baseline quality region 1812). For example, sub-region 1803 can be rendered at higher quality settings than the remainder of region 1802 The blind spot region 1804 can include differing quality levels, including a low quality region and a very low quality region relative to a baseline quality. For example, sub-region 1805 may be rendered at a lower quality level relative to the remainder of region 1804. Additionally, the different quality levels can be interpolated to enable smoother transitions.

Various rendering settings can be adjusted based on the region of the scene defined by the foveated rendering sampling map with blind spot mapping 1800. Additionally settings can be adjusted at various points along the rendering pipeline, including during a primary shading pass or in conjunction with multi-pass shader operations. For example, the quality of rasterization or ray-tracing portion of the rendering pipeline can be reduced for blind spot regions. Additionally, anti-aliasing quality can be adjusted based on blind spot optimizations.

In one embodiment blind spot optimizations can be applied when using multi-resolution shading techniques, such as coarse pixel shading. For example, the granularity of pixel shader operations can be optimized based on a blind spot determination. In such example, the high quality region 1802 may be shaded on a per-pixel basis, the baseline quality region 1812 may be shaded at a baseline tile granularity of Tx X Ty pixels, and the blind spot region 1804 can be shaded at a tile granularity of CTx X CTy, where Tx and Ty are tile widths in the x and y screen coordinates and C is a blind spot reduction coefficient by which tile granularity is increased for a blind spot region.

In one embodiment, blind spot optimizations are also applied when using multi-rate shading techniques. For example, the high quality region 1802 may be shaded at a per-sample shading rate, the baseline quality region 1812 may be shaded at a per-pixel shading rate, and the blind spot region 1804 can be shaded at coarse pixel shading rate. In one embodiment the coarse pixel shading rate can be once per tile of Tx X Ty pixels, per-pixel on alternating frames, or another shading rate in which shading is bypassed for one or more pixels of the blind spot region 1804.

In one embodiment, blind spot optimizations can also be applied to adjust pre-processing quality for scenes to be viewed on a head mounted display. For example, lens distortion and aberration adjustment quality can be enhanced near the center of the field of view and reduced for the blind spot regions.

In one embodiment, blind spot optimizations can be applied to adjust anti-aliasing quality for rasterization rendering techniques. For example, an adaptive anti-aliasing optimization can be applied that enhances anti-aliasing quality for portions of the scene in the high quality region 1802 and reduces anti-aliasing quality for portions of the scene in the blind spot region 1804. Such optimization can be performed to various anti-aliasing techniques, including but not limited to super sampling and multi-sampling.

In one embodiment, blind spot optimizations can be applied to adjust anti-aliasing quality for ray-tracing rendering techniques. For example, anti-aliasing in ray-tracing can be performed by casting multiple rays per pixel and averaging the result. In one embodiment, ray-tracing rendering is performed on a scene, where a larger number of rays are cast for the high quality region 1802, while a reduced number of rays, for example, less than one ray per pixel, may be cast for the blind spot region 1804.

While blind spot rendering optimizations for head mounted displays have been described and illustrated in FIG. 17 and FIG. 18 in the context of sampling maps, embodiments are not limited to a sampling map implementation of blind spot regions. In one embodiment, a set of equations are defined which enables the renderer to dynamically determine a blind spot region as a function relative to the eye gaze center detected via the eye tracking system. Given a determined eye gaze center from the eye tracking system, the blind spot region can be mathematically determined. Once the blind spot region is determine, a bounding box, or another bounding region, can be provided to the renderer. The renderer can then dynamically reduce rendering quality for the provided bounding region.

In one embodiment, the blind spot optimizations described herein can be enabled via an API extension to existing rasterization or ray-tracing algorithms. Such API extension can enable the provision of a sampling map including a blind spot region or a bounding region (e.g., box, circle, etc.) that defines a blind spot region for a renderer. The renderer can then dynamically adjust the rendering configuration to enable higher performance rendering for the scene by bypassing or reducing the rendering quality for the blind spot region. For stereoscopic rendering in which each eye view is separately rendered, separate sampling maps or bounding regions can be provided for each eye, or a single sampling map or bounding region can be provided for an eye and the blind spot region can be automatically determined for the opposing eye.

In one embodiment, the logic used to determine a blind spot region relative to the center of a determined eye gaze can be adjusted on a per-user basis, to enable per-user compensation or adjustment. The blind spot determination calibration can be performed as part of an initial user-configuration for an eye-tracking enabled head mounted display.

Figure 19:
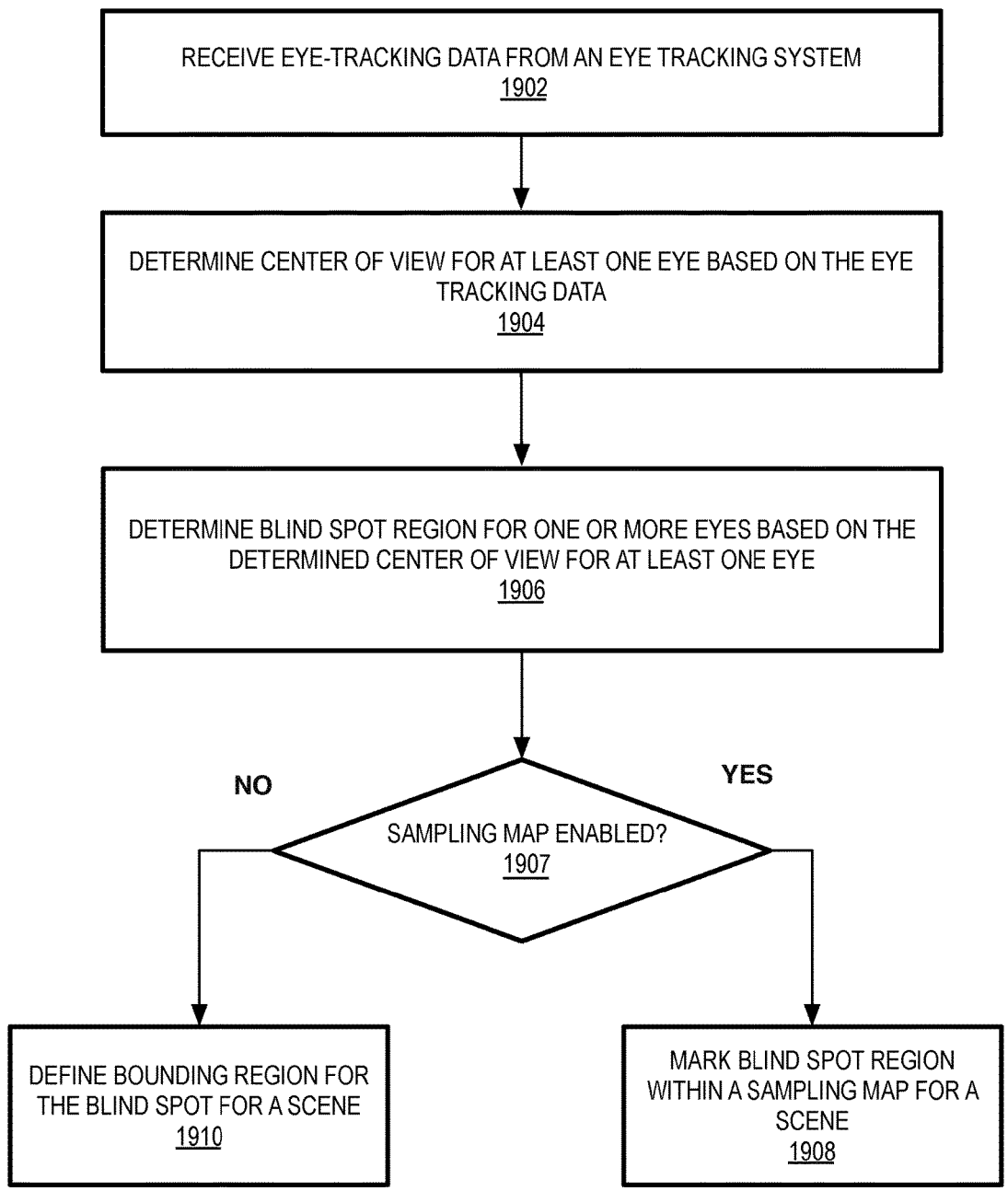
FIG. 19 is a flow diagram of a process for defining a blind spot region for a scene, according to an embodiment.
Figure 20:
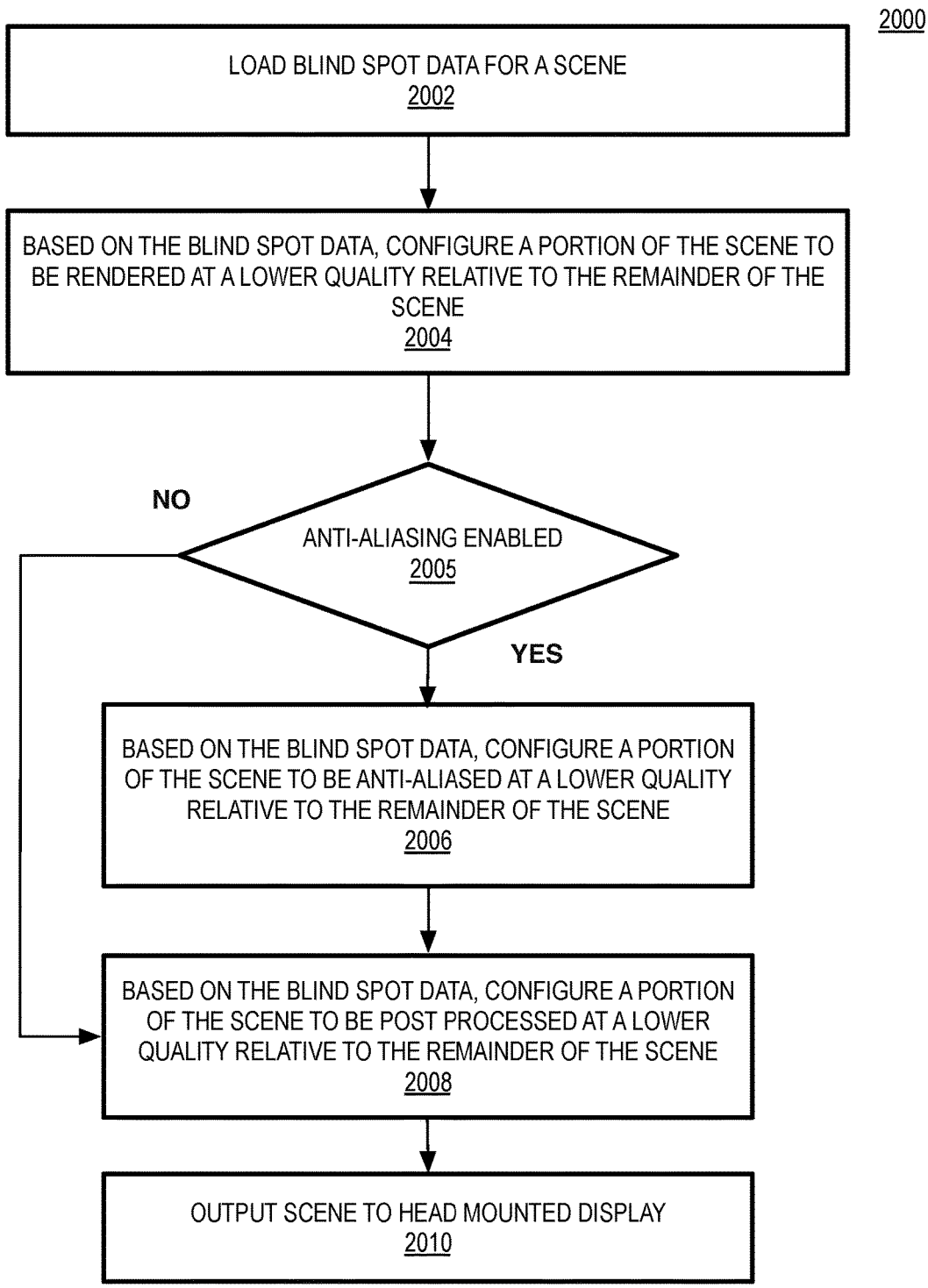
FIG. 20 is a flow diagram illustrating logic to optimize rendering operations using blind spot data, according to an embodiment.
Figure 21:
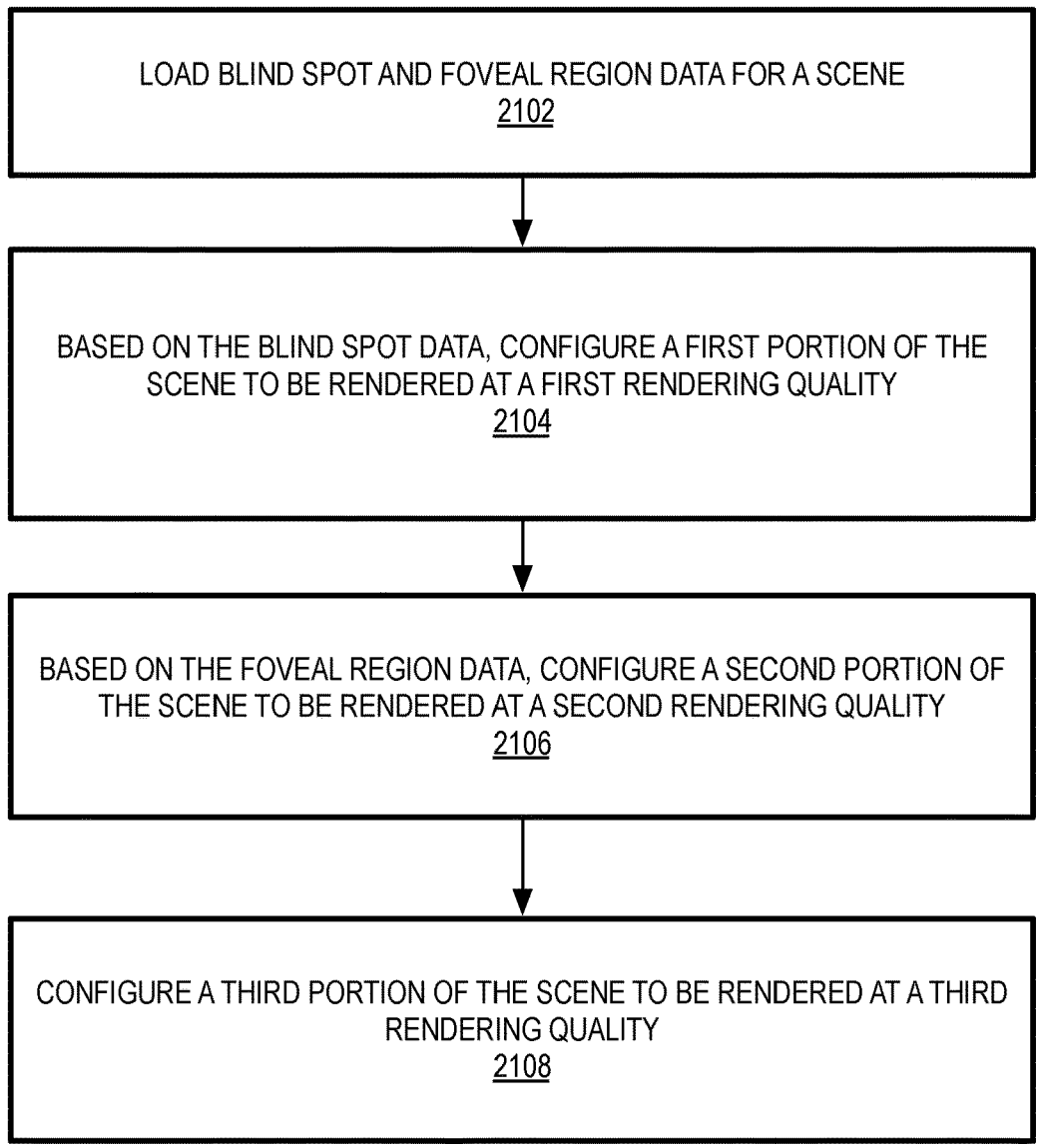
FIG. 21 is a flow diagram of logic to perform blind spot optimization in conjunction with foveated rendering, according to an embodiment.

FIG. 19-21 provide exemplary processes and logic by which blind spot optimizations can be performed when rendering a scene for presentation via a head mounted display. The processes and logic depicted in these figures can be performed by processing logic that comprises hardware (e.g. circuitry, dedicated logic, etc.), software (as instructions on a non-transitory machine-readable storage medium), or a combination of both hardware and software. Some processes may also be performed by dedicated hardware, such as application specific integrated circuit (ASIC), or may be performed by programmable hardware logic, such as a field programmable gate array (FPGA). Although the processes are at least in part illustrated as sequential operations, it should be appreciated that some of the operations described may be performed in a different order than illustrated or may be performed in parallel rather than sequentially.

FIG. 19 is a flow diagram of a process 1900 for defining a blind spot region for a scene, according to an embodiment. In one embodiment, a graphics driver or other software logic associated with a graphics engine or GPU can perform operations of process 1900. Such operations can be performed in conjunction with eye tracking data from an eye tracking system coupled with a head mounted display through which rendered scenes are displayed.

In one embodiment the operations of process 1900 include receiving eye-tracking data from an eye tracking system, as shown at 1902. Based on the eye-tracking data, graphics driver logic, graphics processor logic, or other processor or accelerator logic, can determine a center of view for at least one eye based on tracking data, as shown at 1904. In one embodiment the eye tracking system can provide an input signal directly to a graphics processor and the graphics processor can determine the center of view for the at least one eye. In one embodiment the head mounted display system can include auxiliary processing logic that is configured to manage eye tracking for the head mounted display. In one embodiment a graphics driver or other control logic associated with the graphics processor can determine the center of view for the at least one eye using an application processor or another general-purpose processor.

In one embodiment the operations additionally include determining a blind spot region for one or more eyes based on the determined center of view for at least one eye, as shown at 1906. Such operation can be performed automatically by the eye tracking system and provided to the graphics processor. Alternatively, the graphics driver or graphics processor can determine the bind spot region algorithmically based on the determined center of view for at least one eye. Where the eye tracking system provides eye-tracking data for a single eye, blind spot data for a stereoscopic head mounted display can be automatically determined for the un-tracked eye. Alternatively, the system can maintain blind spot data for a single eye and automatically determine the blind spot data when rendering the view for the untracked eye.

At 1907 operations can vary based on whether the use of a sampling map is enabled for the current rendering operation. A sampling map can be used to provide data on the blind spot region for a scene or can be used in conjunction with other rendering operations, such as a foveated rendering technique in which rendering quality is enhanced near the center of the field of view for a user. Thus, one operation shown at 1908 includes marking a blind spot region within a sampling map for a scene. In one embodiment where foveated rendering is enabled, the blind spot region of the sampling map can automatically be determined relative to the enhanced rendering region If at 1907 a sampling map is not enabled, alternative methods of marking the blind spot region can be used. In one embodiment, as shown at 1910, logic is configured to define a bounding region for the blind spot region of a scene. A bounding box, bounding circle, or other bounding region can be used to identify a blind spot region for a scene. For example, a screen space coordinate and one or more radii can be used to identify one or more bounding regions or sub-regions within the blind spot region for a scene.

FIG. 20 is a flow diagram illustrating logic 2000 to optimize rendering operations using blind spot data, according to an embodiment. In on embodiment, logic 2000 can configure a processor to load blind spot data for a scene, as shown at 2002. The blind spot data can be, for example, a sample map defining a region for low quality rendering associated with a visual blind spot. The sample map can also define a region for high quality rendering associated with the center of the field of view for one or more eyes as determined by an eye tracking system. In one embodiment the blind spot data can be a bounding region which defines the portion of the scene associated with a blind spot.

Based on the blind spot data, rendering for the portion of the scene associated with the blind spot can be performed at a lower quality relative to the remainder (e.g., other regions) of the scene, as shown at 2004. The rendering configuration that is adjusted for the region can include a rasterization or ray-tracing quality and/or one or more shading parameters including a shading rate, a shading resolution, or a shading quality.

If anti-aliasing is enabled, as determined at 2005, parameters for the anti-aliasing algorithm can be adjusted to reduce quality for the blind spot region. For example, based on the blind spot data, logic 2000 can configure a portion of the scene to be anti-aliased at a lower quality relative to the remainder of the scene, as shown at 2006. In one embodiment, performing lower quality anti-aliasing on the blind spot region can include entirely bypassing anti-aliasing operations for the blind spot region. As anti-aliasing can include some post-processing (e.g., resolve) operations as well as some operations performed during primary rendering, reducing the quality of anti-aliasing can also impact other rendering operations. For example, anti-aliasing settings can determine the number of rays per pixel to cast during ray-tracing.

While anti-aliasing is provided as an example of a specific rendering aspect that can be optimized, other aspects of rendering can also be adjusted. Additionally examples include using lower quality geometry for portions of the scene that fall within the blind spot region. Additionally a renderer can use less advanced tessellation techniques, less computationally intensive lighting, fewer bits per pixel for color data, and/or reduced floating point precision for shader operations.

In one embodiment, post rendering processing operations can also be optimized based on a determined blind spot region. In such embodiments, the operations can include to configure a portion of the scene to be post processed at a lower quality relative to the remainder of the scene, as shown at 2008. For example, radial distortion and chromatic aberration compensation for a head mounted display can be performed at a lower quality in blind spot regions relative to the quality used to post process the remainder of the scene.

Once rendering operations are complete, logic 2000 can direct the graphics processor to output the scene to an attached head mounted display, as shown at 2010. For stereoscopic head mounted displays, multiple scenes can be output, where each of the multiple scenes is rendered using blind spot optimizations, although the blind spot region will differ for each eye.

FIG. 21 is a flow diagram of logic 2100 to perform blind spot optimization in conjunction with foveated rendering, according to an embodiment. The logic 2100 can configure a processor to perform operations to load both blind spot and foveal region data for a scene, as shown at 2102. In one embodiment, the blind spot data and foveal region data can be included within one or more sampling maps for one or more views of the scene, can be defined via bounding regions, or can be defined via equations relative to the center of gaze reported by an eye tracking system. In one embodiment the eye gaze data can be sampled from the eye tracking system and the blind spot and foveal regions can be defined before rendering operations begin for a scene. In one embodiment, the blind spot and foveal regions can be determined in parallel on an application processor during the scene setup period on a graphics processor configured to render the scene. Alternatively multiple graphics processors can be used, with one graphics processor configured to perform head mounted display related operations with an additional graphics processor configured to perform primary rendering operations.

The operations can additionally include configuring a first portion of the scene to be rendered at a first rendering quality based on the blind spot data, as shown at 2104. The first portion of the scene corresponds with a portion of the scene that falls within a blind spot region of the scene to be rendered. The first rendering quality can be a pre-defined rendering quality that is lower than the rendering quality in which the remainder of the scene is rendered. Configuring the rendering quality for the first portion of the scene can include various rendering parameters and settings, including settings and configuration associated with shading, anti-aliasing settings and/or post-processing.

As shown at 2106, the operations can additionally include configuring a second portion of the scene to be rendered at a second rendering quality based on the foveal region data. The second rendering quality can be a higher rendering quality relative to the remainder of the scene and can include higher quality settings and configuration for shading, anti-aliasing, and/or post processing. In one embodiment, a hybrid rendering approach can be employed in which portions of the lighting and shading operations for the foveal region are performed using ray-tracing or photon casting techniques while the remainder of the scene is rasterized.

As shown at 2108, the operations can additionally include configuring a third portion of the scene to be rendered at a third rendering quality. The third rendering quality, in some implementations, can be applied to portions of the scene that are not in the foveal region or blind spot region. In one embodiment the third portion of the scene may be the majority of the scene. The rendering settings and configuration associated with the third rendering quality can be an intermediate setting between the first rendering quality and the second rendering quality.

Figure 22:
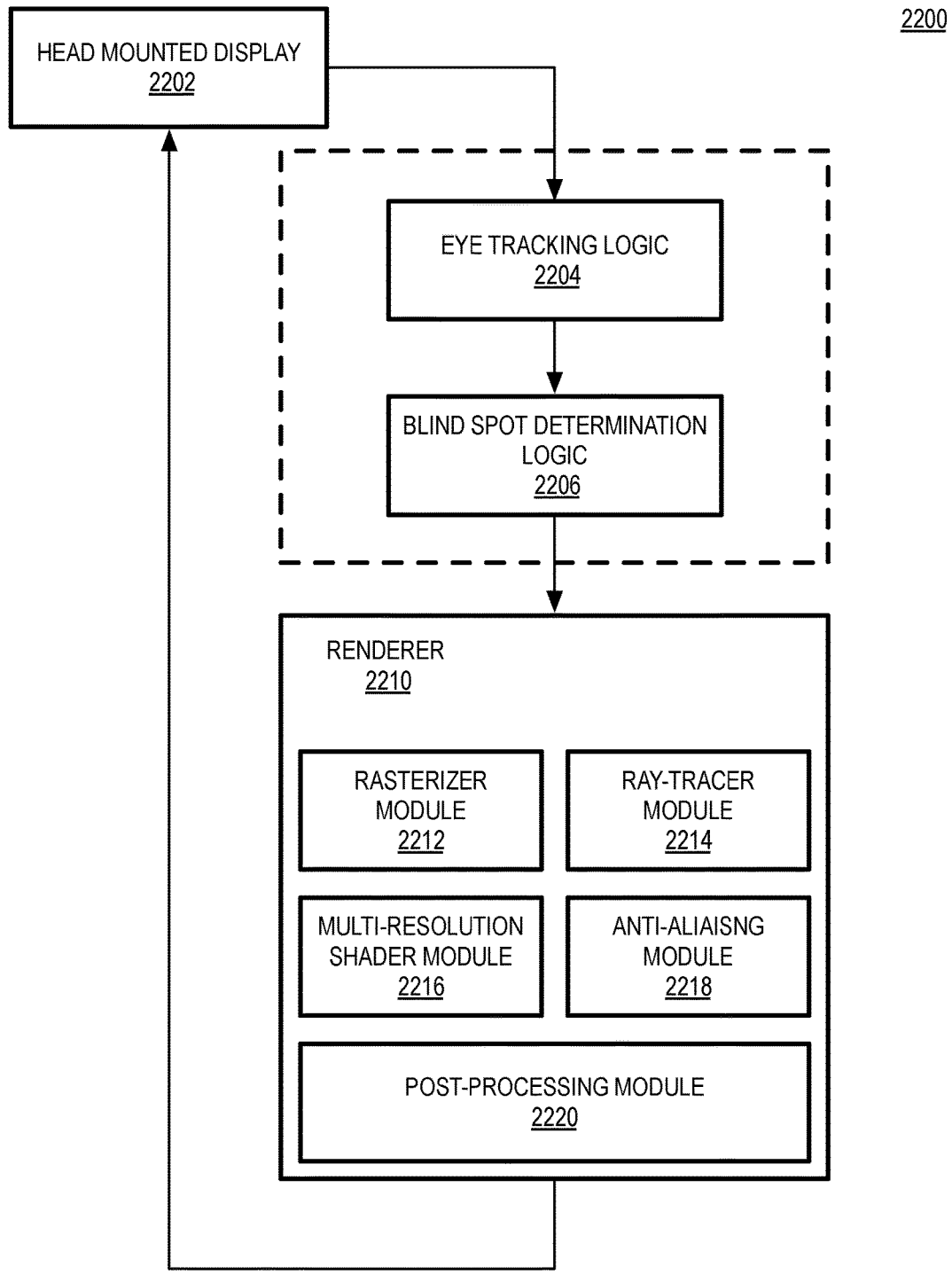
FIG. 22 is a block diagram of a graphics system according to an embodiment.

FIG. 22 is a block diagram of a graphics system 2200 according to an embodiment. The graphics system 2200 includes a head mounted display 2202, which can be similar to the head mounted display system 1500 of FIG. 15. The graphics system 2200 also includes eye tracking logic 2204 and blind spot determination logic 2206. The graphics system 2200 also includes a renderer 2210, which can be included within a graphics processor as described herein. In one embodiment, some portions of the renderer 2210 may also operate in conjunction with logic executing on an application processor. For example, the ray-tracer module 2214 included within the renderer 2210 may operate in part using an application processor connected with the graphics system 2200.

The head mounted display 2202 includes an eye tracking system that can provide eye-tracking data to eye tracking logic 2204. The eye tracking logic 2204 can determine an eye orientation of one or more tracked eyes using various eye tracking technique and/or algorithms known in the art. In one embodiment the eye tracking logic 2204 can also determine a center of a field of view for one or more tracked eyes. Alternatively, blind spot determination logic 2206 can determine the center of the field of view. The eye tracking logic 2204 can be included in the head mounted display 2202 or can be executed by software logic associated with the head mounted display 2202, such as a runtime library or display driver. The blind spot determination logic 2206 can be included in driver logic associated with a graphics processor. In one embodiment, graphics processor hardware logic can be configured to perform the operations for the blind spot determination logic 2206.

Based on the determined center of view, a foveal region and a blind spot region can be determined relative to the center of the field of view determined based on the eye tracking data. The blind spot and foveal region information can be provided to the renderer 2210 for use in optimizing rendering operations. Various modules of the renderer 2210 can be configured based on blind spot and foveal region data, including a rasterizer module 2212, ray-tracer module 2214, multi-resolution shader module 2216, anti-aliasing module 2218, and post-processing module 2220. The rasterizer module 2212 can perform adaptive rasterization operations and/or configure the renderer 2210 to perform adaptive rasterization based on the blind spot and foveal region data. The rasterizer model can be configured to adjust quality settings throughout the rasterization pipeline based on blind spot and foveal region data, including vertex, tessellation, and geometry settings. The ray-tracer module 2214 can perform adaptive ray-tracing operations and/or configure the renderer 2210 to perform adaptive ray tracing based on the blind spot and foveal region data.

The anti-aliasing module 2218 can be configured based on blind spot and foveal region data to adjust anti-aliasing quality for blind spot and foveal regions of the scene. In one embodiment configuration associated with the anti-aliasing module 2218 can be implemented at least in part via the ray-tracer module 2214 for certain ray-tracing anti-aliasing techniques.

In one embodiment, a multi-resolution shader module 2216 can be configured to adjust a granularity or shading rate for portions of a scene that fall within blind spot and foveal regions of a scene, such that blind spot regions of a scene can be shaded at a lower quality, a lower precision, or at a lower frequency relative to the remainder of the scene.

In one embodiment a post-processing module 2220 can also be configured based on blind spot and foveal region data. The post-processing module can be configured to perform various post-rendering operations, including pre-warping and/or radial distortion and chromatic aberration correction for scenes to be presented on the head mounted display 2202. The quality settings for the post-processing module 2220, relative to the remainder of the scene, can be reduced for portions of the scene in the blind spot region and increased for portions of the scene in the foveal region. The one or more rendered and post processed scenes can then be output from the renderer 2210 and displayed on the head mounted display 2202. The operations of the illustrated modules can then be repeated for each successive frame, while adjusting the blind spot and foveal regions based on eye orientated detected for each frame.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. An apparatus comprising:
one or more processors to:
receive eye tracking data from an eye tracking system;
determine a blind spot region for each eye for a scene based on the eye tracking data, the blind spot region for each eye corresponding with a region of the scene which, when viewed via a display panel of a head mounted display, is to fall within a blind spot of the eye, wherein the blind spot of the eye is defined by an attachment point of an optic nerve; and
provide identifying data for the blind spot region to a renderer, wherein the renderer is operable to render pixels of the scene, including rendering pixels that fall within the blind spot region at a lower rendering quality relative to other regions of the scene, the renderer further operable to adjust, for lens distortion and aberration, pre-processing quality of areas of the scene that will be viewed through a center of a lens of the head mounted display and reducing quality of areas, including the blind spot region for each eye, that will be blurred by lens distortion.

2. The apparatus as in claim 1, wherein the one or more processors are further to provide the identifying data for the blind spot region via a bounding region.

3. The apparatus as in claim 1, wherein the one or more processors are further to provide the identifying data for the blind spot region via a sampling map.

4. The apparatus as in claim 3, wherein the one or more processors are further to identify one or more sub-regions of the blind spot region via the sampling map.

5. The apparatus as in claim 4, wherein the renderer is configured to interpolate between the one or more sub-regions of the blind spot region to determine a rendering quality for a pixel within the blind spot region.

6. The apparatus as in claim 1, wherein the one or more processors are further to determine a center of a visual field for at least one eye based on the eye tracking data.

7. The apparatus as in claim 6, wherein the one or more processors are further to determine the blind spot region relative to the center of the visual field.

8. The apparatus as in claim 7, wherein the one or more processors are further to provide identifying data for a foveal region in the center of the visual field to the render and the renderer is to render pixels within the foveal region at a higher rendering quality relative to other regions of the scene.

9. The apparatus as in claim 8, wherein the one or more processors are further to provide identifying data for one or more sub-regions for the foveal region and the renderer is configured to interpolate between the one or more sub-regions of the foveal region to determine a rendering quality for a pixel within the foveal region.

10. The apparatus as in claim 1, wherein the renderer includes one or more of a rasterizer module, a ray-tracer module, a multi-resolution shader module, and an anti-aliasing module.

11. A method for rendering a scene for a head mounted display, the method comprising:
receiving eye-tracking data from an eye tracking system;
determining a blind spot region for each eye of a scene based on the eye tracking data, the blind spot region for each eye corresponding with a region of the scene which, when viewed via a display panel of a head mounted display, is to fall within a blind spot of the eye, wherein the blind spot of the eye is defined by an attachment point of an optic nerve;
providing, to a renderer, identifying data for the blind spot region of a scene to be displayed via the head mounted display to a renderer; and
rendering, with the renderer, pixels of the scene, including pixels that fall within the blind spot region at a lower rendering quality relative to other regions of the scene, including adjusting, for lens distortion and aberration, pre-processing quality of areas of the scene that will be viewed through a center of a lens of the head mounted display and reducing quality of areas, including the blind spot region for each eye, that will be blurred by lens distortion.

12. The method as in claim 11, additionally comprising determining a center of a visual field for at least one eye based on the eye tracking data and providing identifying data for a foveal region in the center of the visual field to the render.

13. The method as in claim 12, additionally comprising rendering pixels within the foveal region at a higher rendering quality relative to other regions of the scene.

14. The method as in claim 13, additionally comprising providing, to the renderer, identifying data for one or more sub-regions of the blind spot region and the foveal region, each of the one or more sub-regions identifying a different rendering quality.

15. The method as in claim 14, additionally comprising outputting a rendered scene to the head mounted display.

16. A system comprising:
a non-transitory machine-readable storage device to store instructions; and
one or more processors to execute the instructions, wherein the instructions cause the one or more processor to perform operations to:
receive eye tracking data from an eye tracking system;
determine a center of a visual field for at least one eye based on the eye tracking data;
determine a blind spot region for each eye for a scene relative to the center of the visual field, the blind spot region for each eye corresponding with a region of the scene which, when viewed via a display panel of a head mounted display, is to fall within a blind spot of the eye, wherein the blind spot of the eye is defined by an attachment point of an optic nerve; and
provide identifying data for the blind spot region to a renderer of the one or more processors;
render pixels of the scene, including pixels that fall within the blind spot region at a lower rendering quality relative to other regions of the scene by, at least in part, adjusting, for lens distortion and aberration, pre-processing quality of areas of the scene that will be viewed through a center of a lens of the head mounted display and reducing quality of areas, including the blind spot region for each eye, that will be blurred by lens distortion.

17. The system as in claim 16, the instructions to cause the one or more processors to perform additional operations to provide identifying data for a foveal region in the center of the visual field to the render and the renderer is to render pixels within the foveal region at a higher rendering quality relative to other regions of the scene.

18. The system as in claim 17, the instructions to cause the one or more processors to perform additional operations to provide identifying data for one or more sub-regions of the foveal region and the blind spot region.

19. The system as in clam 18, wherein the renderer is configured to interpolate between the one or more sub-regions of the foveal region and the blind spot region to determine a rendering quality for a pixel within the foveal region.

20. The system as in claim 19, wherein the renderer includes one or more of a rasterizer module, a ray-tracer module, a multi-resolution shader module, and an anti-aliasing module.

21. A non-transitory machine-readable medium storing instructions which, when executed by one or more processors, cause the one or more processors to perform operations for rendering a scene for a head mounted display, the operations comprising:
receiving eye-tracking data from an eye tracking system;
determining a blind spot region for each eye of a scene based on the eye tracking data, the blind spot region for each eye corresponding with a region of the scene which, when viewed via a display panel of a head mounted display, is to fall within a blind spot of the eye, wherein the blind spot of the eye is defined by an attachment point of an optic nerve;
providing, to a renderer, identifying data for the blind spot region of a scene to be displayed via the head mounted display to a renderer; and
rendering, with the renderer, pixels of the scene, including pixels that fall within the blind spot region at a lower rendering quality relative to other regions of the scene, including adjusting, for lens distortion and aberration, pre-processing quality of areas of the scene that will be viewed through a center of a lens of the head mounted display and reducing quality of areas, including the blind spot region for each eye, that will be blurred by lens distortion.

22. The non-transitory machine-readable medium as in claim 21, the operations additionally comprising determining a center of a visual field for at least one eye based on the eye tracking data and providing identifying data for a foveal region in the center of the visual field to the render.

23. The non-transitory machine-readable medium as in claim 22, the operations additionally comprising rendering pixels within the foveal region at a higher rendering quality relative to other regions of the scene.

24. The non-transitory machine-readable medium as in claim 23, the operations additionally comprising providing, to the renderer, identifying data for one or more sub-regions of the blind spot region and the foveal region, each of the one or more sub-regions identifying a different rendering quality.

25. The non-transitory machine-readable medium as in claim 24, the operations additionally comprising outputting a rendered scene to the head mounted display.

* * * * *